United States Patent
Reddy et al.

(10) Patent No.: US 12,461,188 B2
(45) Date of Patent: Nov. 4, 2025

(54) SELF-POSITIONING OF ELECTRONIC SHELF LABEL (ESL) DEVICES THROUGH INTER-ESL LINKS

(71) Applicant: QUALCOMM Incorporated, San Diego, CA (US)

(72) Inventors: Varun Amar Reddy, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 190 days.

(21) Appl. No.: 18/470,131

(22) Filed: Sep. 19, 2023

(65) Prior Publication Data
US 2025/0093453 A1    Mar. 20, 2025

(51) Int. Cl.
*G01S 5/02* (2010.01)
*G06Q 10/087* (2023.01)
*H04W 64/00* (2009.01)

(52) U.S. Cl.
CPC ......... *G01S 5/0244* (2020.05); *G01S 5/0289* (2013.01); *G06Q 10/087* (2013.01); *H04W 64/00* (2013.01); *G01S 2205/02* (2020.05)

(58) Field of Classification Search
CPC .. G01S 5/0244; G01S 5/0289; G01S 2205/02; G06Q 10/087; H04W 64/00
See application file for complete search history.

(56) References Cited

U.S. PATENT DOCUMENTS

| | | | | |
|---|---|---|---|---|
| 5,818,346 | A * | 10/1998 | Goodwin, III | G06Q 30/02 340/8.1 |
| 8,730,044 | B2 * | 5/2014 | Campero | G08B 13/2474 340/10.2 |
| 11,356,805 | B2 * | 6/2022 | Banavar | H04W 4/33 |

(Continued)

FOREIGN PATENT DOCUMENTS

| | | |
|---|---|---|
| WO | WO-2022085837 A1 | 4/2022 |
| WO | WO-2022211889 | 10/2022 |

OTHER PUBLICATIONS

Ock, Jinwoo, et al. "Low-power wireless with denseness: The case of an electronic shelf labeling system—Design and experience." IEEE Access 7 (2019): 163887-163897. (Year: 2019).*

(Continued)

*Primary Examiner* — Nathan A Mitchell
(74) *Attorney, Agent, or Firm* — Norton Rose Fulbright US LLP

(57) ABSTRACT

This disclosure provides systems, methods, and devices for Electronic Shelf Label (ESL) systems that support positioning of ESL devices. In a first aspect, a method includes: determining known positions of a first subset of ESL devices; receiving positioning measurements for each ESL device in a second subset of ESL devices; estimating a first position of each ESL device in the second subset based on the positioning measurements received for that ESL device and the known positions of the first subset; determining a positioning error associated with the first position of each ESL device in the second subset; and estimating a second position of each ESL device in the second subset based on the positioning error and additional positioning measurements received for that ESL device. Other aspects and features are also claimed and described.

30 Claims, 12 Drawing Sheets

(56) References Cited

U.S. PATENT DOCUMENTS

| | | | | |
|---|---|---|---|---|
| 12,136,362 | B1* | 11/2024 | Liang | G01S 5/0278 |
| 2019/0069263 | A1* | 2/2019 | Ylamurto | H04W 64/003 |
| 2019/0362300 | A1* | 11/2019 | Bottine | G06Q 10/087 |
| 2020/0132470 | A1 | 4/2020 | Xu et al. | |
| 2022/0051310 | A1 | 2/2022 | Graube et al. | |
| 2023/0042843 | A1* | 2/2023 | Rössl | G01C 9/00 |
| 2023/0274667 | A1* | 8/2023 | Hou | G09F 3/204 |
| | | | | 340/5.91 |
| 2024/0402777 | A1* | 12/2024 | Song | G06Q 10/087 |
| 2025/0014214 | A1* | 1/2025 | Schwarz | G06T 7/80 |
| 2025/0067834 | A1* | 2/2025 | Reddy | G01S 5/0284 |
| 2025/0086582 | A1* | 3/2025 | Tada | G06Q 10/087 |

OTHER PUBLICATIONS

International Search Report and Written Opinion—PCT/US2024/046149—ISA/EPO—Feb. 10, 2025.
Partial International Search Report—PCT/US2024/046149—ISA/EPO—Dec. 18, 2024.

* cited by examiner

SELF-POSITIONING OF ELECTRONIC SHELF LABEL (ESL) DEVICES THROUGH INTER-ESL LINKS

TECHNICAL FIELD

Aspects of the present disclosure relate generally to electronic shelf label (ESL) systems, and more particularly, to methods and systems for locating or positioning ESL devices of an ESL system deployed within an indoor environment.

INTRODUCTION

In general, retail stores use paper labels to display information about products displayed on shelves, such as prices, discount rates, unit costs, origins, or the like. Using such paper labels for the price display has limitations. For example, when there are changes in product information or locations on shelves, the retailer must generate new paper labels and discard old ones. This raises costs for maintenance in both supplies and employee labor. Further, in environmental terms, replacing the labels wastes raw materials such as paper, which adversely affects the protection of the environment. Still further, humans are prone to make mistakes, such as mislabeling a shelf or product or forgetting to take down temporary price changes on certain shelving, which results in shopper frustration.

Electronic shelf label (ESL) devices are electronic devices for displaying price or other relevant information for items on retail store shelves, which may be used in place of paper labels. ESL devices may be attached to a front edge of retail shelving and display a variety of information using display devices, such as Liquid Crystal Displays (LCD). Whenever the information about a product or the location of a product is changed, the ESL device may be programmed with new product information. Thus, the same electronic shelf label can be repeatedly used.

The devices or nodes of an ESL system may be equipped with Bluetooth Low Energy (BLE) radios that can be used to track the location of a BLE-enabled device based on the known locations of nearby ESL devices within a retail environment. However, the deployment of such an ESL system may be a labor-intensive process in which hundreds or thousands of ESL devices need to be individually installed and positioned across different locations within the environment. Also, knowing the actual locations of all ESL devices may be difficult due to positioning errors during deployment or the physical relocation of certain ESL devices after deployment.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Electronic shelf label (ESL) devices may be used in a wireless network to provide information and services to shoppers and retailers (as users of an ESL system). For example, ESL devices operating on a wireless network as part of ESL system may support indoor positioning services to identify the position of ESL devices within an indoor environment (e.g., a retail environment, such as a floor space of a retail store). As another example, the ESL system may support position location services to identify a position of a user within the environment by interacting with the user's mobile device. As still another example, the ESL system may employ an iterative self-positioning process to estimate the positions of various ESL devices deployed within the environment.

In some embodiments, a first subset of ESL devices whose positions are known may be used to estimate the positions of a second subset of ESL devices. The ESL devices in the second subset may collect and report radio frequency (RF) measurements of beacons broadcasted by the first subset. The RF measurements may be used to estimate a position of each ESL device in the second subset. A positioning error associated with the estimated position may be determined based on geometric dilution of precision (GDOP) values and/or an uncertainty or confidence metric associated with the positioning measurements (e.g., a signal-to-noise ratio (SNR) or other quality metric associated with the measured signals). The estimated position of each ESL device in the second subset may then be updated based on additional RF measurements collected over one or more iterations until the associated positioning error falls below a maximum positioning error. For example, the initial RF measurements received for a target ESL device in the second subset whose location is unknown may be used to estimate a coarse position of the device within the environment during a first iteration. The coarse position may be used to trigger "anchor" ESL devices in the first subset whose known locations are within a vicinity of the coarse position (e.g., within the same aisle, gondola, or shelf as the target ESL device) to rebroadcast their beacons. The coarse position of the target ESL device may then be refined over one or more subsequent iterations based on additional RF measurements of the rebroadcasted beacons from the anchor ESL devices. Given the proximity of these anchor ESL devices, the additional RF measurements will likely produce improved positioning estimates with a more favorable GDOP and better SNR.

Accordingly, the disclosed positioning techniques allow the unknown positions of ESL devices to be estimated based on a limited amount of prior information regarding the general deployment or layout of the ESL system within an indoor environment, such as the general spacing between ESL devices and the known locations of a few ESL devices. The disclosed techniques may be particularly useful for reducing both manual labor and communication overhead associated with the positioning of numerous ESL devices in large-scale, dense deployments of ESL systems within indoor environments.

In one aspect of the disclosure, a method includes: determining known positions of a first subset of Electronic Shelf Label (ESL) devices; receiving positioning measurements for each ESL device in a second subset of ESL devices; estimating a first position of each ESL device in the second subset based on the positioning measurements received for that ESL device and the known positions of the first subset; determining a positioning error associated with the first position of each ESL device in the second subset; and estimating a second position of each ESL device in the second subset based on the positioning error and additional positioning measurements received for that ESL device.

In an additional aspect of the disclosure, an apparatus includes at least one processor and a memory coupled to the at least one processor. The at least one processor is configured to perform operations including: determining known positions of a first subset of Electronic Shelf Label (ESL) devices; receiving positioning measurements for each ESL device in a second subset of ESL devices; estimating a first position of each ESL device in the second subset based on the positioning measurements received for that ESL device and the known positions of the first subset; determining a positioning error associated with the first position of each ESL device in the second subset; and estimating a second position of each ESL device in the second subset based on the positioning error and additional positioning measurements received for that ESL device.

In an additional aspect of the disclosure, a non-transitory computer-readable medium stores instructions that, when executed by a processor, cause the processor to perform operations. The operations include: determining known positions of a first subset of Electronic Shelf Label (ESL) devices; receiving positioning measurements for each ESL device in a second subset of ESL devices; estimating a first position of each ESL device in the second subset based on the positioning measurements received for that ESL device and the known positions of the first subset; determining a positioning error associated with the first position of each ESL device in the second subset; and estimating a second position of each ESL device in the second subset based on the positioning error and additional positioning measurements received for that ESL device.

In an additional aspect of the disclosure, an electronic shelf label (ESL) system, comprising: a first subset of electronic shelf label (ESL) devices; a second subset of ESL devices; and a server comprising a memory; and at least one processor coupled to the memory and configured to perform operations comprising: determining known positions of the first subset of ESL devices; receiving positioning measurements for each ESL device in the second subset of ESL devices; estimating a first position of each ESL device in the second subset based on the positioning measurements received for that ESL device and the known positions of the first subset; determining a positioning error associated with the first position of each ESL device in the second subset; and estimating a second position of each ESL device in the second subset based on the positioning error and additional positioning measurements received for that ESL device.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

Devices, networks, and systems may be configured to communicate via one or more portions of the electromagnetic spectrum. The present disclosure describes certain aspects with reference to certain communications technologies, such as Bluetooth or Wi-Fi. However, the description is not intended to be limited to a specific technology or application, and one or more aspects described with reference to one technology may be understood to be applicable to another technology. Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus, and methods described herein may be applied to other communications systems and applications than the particular examples provided.

For example, the described implementations may be implemented in any device, system, or network that is capable of transmitting and receiving RF signals according to any of the wireless communication standards, including any of the IEEE 802.11 standards, the IEEE 802.15.1 Bluetooth® standards, Bluetooth low energy (BLE), code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, 5G New Radio (5G NR), 6G, or other known signals that are used to communicate within a wireless, cellular, or internet of things (IOT) network, such as a system utilizing 3G, 4G 5G, or 6G technology, or further implementations thereof.

In various implementations, the techniques and apparatus may be used in wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably and may refer to a collection of devices capable of communicating with each other through one or more communications techniques.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, or packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.).

Implementations may range from chip-level or modular components to non-modular, non-chip-level implementations and further to aggregated, distributed, or original equipment manufacturer (OEM) devices or systems incorporating one or more described aspects. In some settings, devices incorporating described aspects and features may also include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, or constitutions.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

As used herein, including in the claims, the term "or," when used in a list of two or more items, means that any one of the listed items may be employed by itself, or any combination of two or more of the listed items may be employed. For example, if a device is described as containing components A, B, or C, the device may contain A alone; B alone; C alone; A and B in combination; A and C in combination; B and C in combination; or A, B, and C in combination.

Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

Also, as used herein, the term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

Also, as used herein, relative terms, unless otherwise specified, may be understood to be relative to a reference by a certain amount. For example, terms such as "higher" or "lower" or "more" or "less" may be understood as higher, lower, more, or less than a reference value by a threshold amount.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1A:
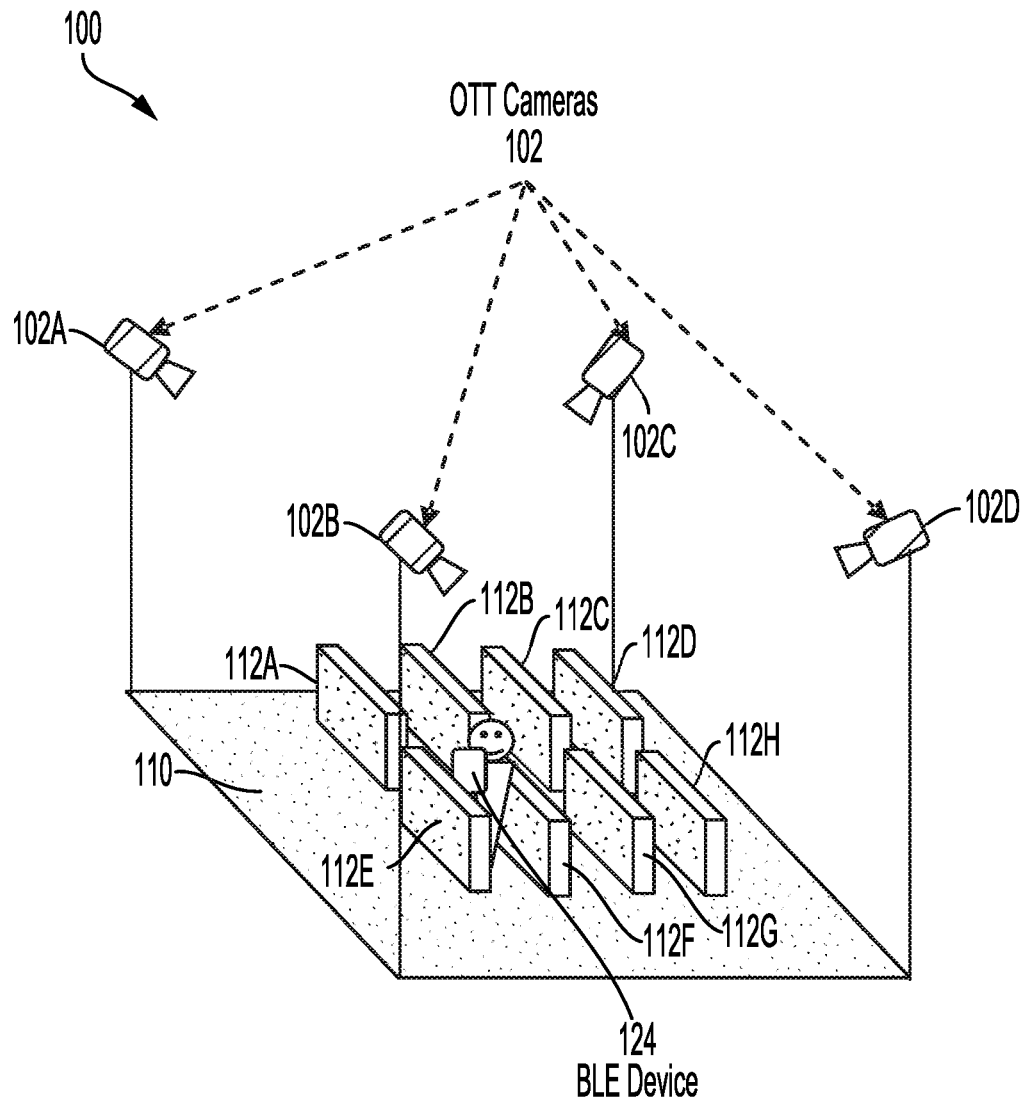
FIG. 1A is a block diagram illustrating a perspective view of an example Electronic Shelf Label (ESL) system within an indoor environment according to some embodiments of this disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support indoor positioning of user devices or objects within an indoor environment, such as a retail environment corresponding to a floor space of a retail store or warehouse. In some embodiments, an Electronic Shelf Label (ESL) system may be deployed within the environment for purposes of monitoring or tracking assets (e.g., product locations) and providing indoor positioning and navigation services for users (e.g., customers or store employees) within the environment. The ESL system may include a dense deployment of ESL devices across multiple gondolas throughout the environment. For example, each gondola may include multiple shelves and each shelf may include one or more ESL devices, e.g., for displaying pricing and other relevant information regarding products placed on the shelf.

Particular implementations of the subject matter described in this disclosure may be implemented to realize one or more of the following potential advantages or benefits. In some aspects, the present disclosure provides techniques for wireless communication systems that may be particularly beneficial in Electronic Shelf Label (ESL) applications within indoor environments. To address the positioning-related challenges associated with dense deployments of ESL devices within an indoor environment, the ESL system may provide indoor positioning services for locating or positioning new or recently deployed ESL devices ("target ESL devices" or "target ESLs") within the environment based on the known positions of previously deployed ESL devices ("anchor ESL devices" or "anchor ESLs") as well as any other prior information that may be available regarding the ESL infrastructure and/or environment. Accordingly, the disclosed techniques enable the position of ESL devices to be estimated using the existing infrastructure of the ESL system without requiring user intervention or extra communication overhead associated with the position estimation process.

As will be described in further detail below, the disclosed techniques may utilize an iterative process to estimate the position of each target ESL within the environment based on radio frequency (RF) measurements of radio signals transmitted by the anchor ESLs and received by the target ESL. For example, a first iteration of the position estimation process may produce an initial estimate of a target ESL's position, which may be a coarse location of the device within the environment (e.g., corresponding to an aisle between adjacent gondolas in a retail environment). This coarse location or initial position estimate may then be refined over one or more successive iterations based on additional RF measurements collected by the target ESL.

The additional RF information may include, for example, measurements of RF signals transmitted by one or more anchor ESLs in a vicinity of the target ESL (e.g., on the same aisle, gondola, or shelf as the target device). The one or more anchor ESLs may be identified based on the estimated position of the target ESL from the first iteration. Given the relative proximity of the identified anchor ESL(s) to the target ESL (as compared with other anchor ESLs, which may be located in a different aisle or gondola), a second iteration of the positioning process using the additional RF measurements may produce an improved positioning estimate with a more favorable geometric dilution of precision (GDOP) and a better signal-to-noise ratio (SNR) (and thus, less error). In some embodiments, additional iterations of the process may be performed to further improve or refine the estimated position, e.g., until a positioning error associated with the estimated position is less than a maximum positioning error tolerance. The error tolerance may be a value or range of values based on, for example, GDOP, SNR, and/or any other appropriate measure of positioning error or location precision.

The terms "positioning" and "self-positioning" are used interchangeably herein to refer to estimating the position of a device (e.g., an ESL device of an ESL system) deployed within an indoor environment as opposed to the physical placement of the device within the environment. Also, it should be understood that in the context of ESL systems, the actual positioning or position estimation is performed by a different device (e.g., a server or access point) of the ESL system rather than the ESL device itself. As described above, the position of a target ESL device may be determined based on RF measurements collected by the ESL device and prior information regarding the infrastructure of the ESL system within the indoor environment (such as the known positions of anchor ESL devices). Accordingly, the disclosed techniques enable ESL devices (representing nodes of the ESL system) to be "self-positioned" based on the existing infrastructure of the system and the cooperation between nodes and other system components with little or no user intervention.

While the following examples will be described below in the context of a retail environment, it should be appreciated that embodiments of the present disclosure are not intended to be limited thereto and that the disclosed positioning (or position estimation) techniques may be applied to any of various indoor environments.

FIG. 1A is a block diagram illustrating a perspective view of an example ESL system 100 according to some embodiments of this disclosure. As shown in FIG. 1A, the ESL system 100 may be deployed across multiple gondolas 112A-112H within a retail environment 110. The retail environment 110 may include, for example, a floor space of a retail store, such as a grocery or department store. As will be described in further detail below, each of the gondolas 112A-112H may include a plurality shelves and one or more ESL devices may be attached to each shelf. The ESL devices may be used to display pricing and/or other information related to products located on the corresponding shelves. In some implementations, each of the gondolas 112A-112H as well as each shelf and each aisle between the gondolas 112A-112H may be assigned a unique identifier to distinguish it from other aisles, gondolas, and shelves in the retail environment 110. Each ESL device may be equipped with one or more wireless radios for transmitting and receiving information over a wireless network associated with the retail store. Such radios may support any of various wireless communication standards and technologies. Examples of such technologies include, but are not limited to, Bluetooth, Bluetooth Low Energy (BLE), 5G NR, ultra-wideband (UWB), and other RF technologies.

In some implementations, cameras may be installed on or near the shelves at the ends of the gondolas 112A-112H to capture different views of the aisles between the gondolas 112A-112H and/or other pathways in the areas surrounding the gondolas 112A-112H. Additionally, over-the-top (OTT) cameras 102A-102D (or "OTT cameras 102" collectively) may be positioned at different overhead locations throughout the retail store to capture larger regions of the retail environment 110. For example, the OTT cameras 102 may be part of surveillance system of the retail store in which the OTT cameras 102 are used for security and monitoring purposes.

In some embodiments, images and/or video captured by the OTT cameras 102 and/or those captured by the shelf cameras on the gondolas 112A-112H may serve as visual channel state information (CSI) that can be used to determine or confirm the position of one or more ESL devices within the retail environment 110. In some implementations, such information may also be used to determine the position of a BLE device 124 within the retail environment 110. The BLE device 124 may be, for example, a mobile device of a user (e.g., a customer or employee of the retail store). The BLE device 124 and each ESL device may be equipped with a BLE radio for transmitting and/or receiving low power beacons. Such beacons may also be transmitted by access points of the wireless network associated with the retail environment 110. As will be described in further detail below with respect to FIG. 1B, radio frequency (RF) measurements of the ESL beacons captured by the BLE device 124 and each ESL device may be provided to a management server of the ESL system 100 for performing the iterative positioning techniques disclosed herein.

Figure 1B:
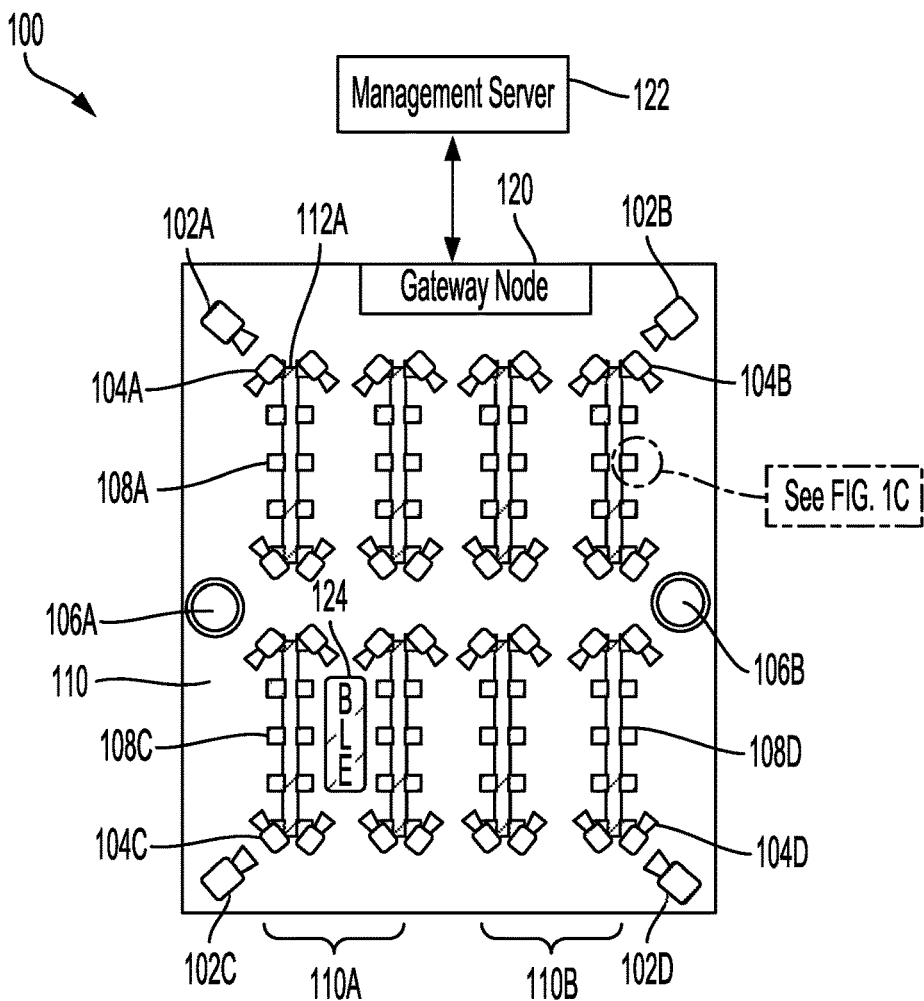
FIG. 1B is a block diagram of an overhead view of the ESL system of FIG. 1A according to some embodiments of this disclosure.

FIG. 1B is a block diagram of an overhead view of the ESL system 100 of FIG. 1A according to some embodiments of the disclosure. As shown in FIG. 1B, the ESL system 100 may further include a management server 122 that is integrated with or communicatively coupled to a gateway node 120. The management server 122 may include at least one processor coupled to a memory, which may be a computer-readable medium for storing instructions or program code executable by the at least one processor. In some implementations, the at least one processor may be configured to execute computer program code stored in the memory to cause the management server 122 to perform operations related to managing operation of ESL devices 108A-108D, an access point (AP) 106A, an access point (AP) 106B, the gateway node 120, and/or other components within the ESL system 100. For example, the management server 122 may perform operations relating to the iterative positioning of ESL devices within the retail environment 110, as will be described in further detail below.

The gateway node 120 may communicate with access points (APs) 106A and 106B. Although two APs are shown in the example of FIG. 1B, fewer or more APs may be included in the ESL system 100. The APs 106A and 106B may communicate through a first communication network, either wired or wireless, with the gateway node 120. The APs 106A and 106B may also communicate through a second communication network with the ESL devices 108A-108D. In some embodiments, the first and second communication networks may be different networks. For example, the first communication network (e.g., between the AP 106A and the gateway node 120) may be a Wi-Fi network, and the second communication network (e.g., between the AP 106A and the ESL device 108A) may be a Bluetooth network.

In some embodiments, each of the APs 106A and 106B may communicate with a subset of the ESL devices 108A-108D located in a geographic area assigned to that AP, e.g., based on a location of the AP relative to each ESL device and/or a signal coverage area of the AP. For example, the retail environment 110 may be divided into two geographic areas that each cover approximately half of the total area of the retail environment 110. The AP 106A may be assigned to a geographic area 110A, and the AP 106B may be assigned to a geographic area 110B. Accordingly, the AP 106A may communicate with ESL device 108A and ESL device 108B located in the geographic area 110A, and the AP 106B may communicate with ESL device 108C and ESL device 108D located in the geographic area 110B.

As described above, the ESL devices 108A-108D may communicate with their respective APs 106A and 106B via a Bluetooth network. Bluetooth technology generally provides a secure way to connect and exchange information between electronic devices, such as smartphones, other cellular phones, headphones, earbuds, smartwatches, laptops, wearables, and/or shelf labels. Bluetooth communications may include establishing wireless personal area networks (PANs) (also referred to as "ad hoc" or "peer-to-peer" networks). These ad hoc networks are commonly called "piconets." For example, the ESL devices 108A and 108B may be in a first piconet with the AP 106A while the ESL devices 108C and 108D may be in a second piconet with the AP 106B. It should be appreciated, however, that each ESL device may belong to multiple piconets in some implementations. Multiple interconnected piconets may be called scatternets. A scatternet may be formed when a member of the first piconet elects to participate in the second piconet.

Because many of the services offered over Bluetooth can expose private data or allow the connecting party to control the connected device, Bluetooth networks may have devices first establish a "trust relationship" before they are allowed to communicate private data to one another. This trust relationship may be established using a process referred to as "pairing," in which a bond is formed between two devices. This bond enables the devices to communicate with each other in the future without further authentication. Thus, the ESL device 108A in FIG. 1B may be bonded in such a manner to the AP 106A. The pairing process may be triggered automatically each time the device is powered on or moved within a certain distance of another Bluetooth device. Pairing information relating to current and previously established pairings may be stored in a paired device list (PDL) in the memory of the Bluetooth device, such as the ESL device 108A and/or the AP 106A. This pairing information may include a name field, an address field, a link key field, and other similar fields (such as "profile" type) useful for authenticating the device or establishing a Bluetooth communication link. The pairing information may allow the ESL device 108A to reconnect to the AP 106A automatically when, for example, power loss causes the ESL system 100 to reset.

A Bluetooth "profile" describes general behaviors through which Bluetooth-enabled devices communicate with other Bluetooth devices. For example, the hands free profile (HFP) describes how a Bluetooth device (such as a smartphone) may place and receive calls for another Bluetooth device, and the Advanced Audio Distribution Profile (A2DP) describes how stereo-quality audio may be streamed from a first Bluetooth device (such as a smartphone) to another Bluetooth device (such as an earbud). The ESL devices 108A-108D may be configured with an ESL Profile compliant with the Electronic Shelf Label Profile Specification v1.0 dated Mar. 28, 2023, which is incorporated by reference herein. The ESL Profile may specify how the AP 106A may use one or more ESL Services exposed by the ESL device 108A.

In some embodiments, the management server 122 may be part of an Enterprise Resource Planning (ERP) system for managing inventory (e.g., products) and other assets (the ESL devices 108A-108D and other components of the ESL system 100) in the retail environment 110. The management server 122 may be, for example, a database server that stores and manages a variety of information used in the operation of a retail store or distribution warehouse. Such information may include product information regarding products displayed in the store as well as the location and other relevant information associated with each component of the ESL system 100 (including each of the ESL devices 108A-108D and the APs 106A and 106B). In some implementations, the information may be stored in a separate inventory management database of the ERP system that is accessible to the management server 122 via a wired or wireless network.

The management server 122 may generate and transmit command messages to the ESL devices 108A-108D via the first communication network described above. The command messages may be used by the management server 122 to carry out various functions in the ESL system 100, such as the synchronization, updating, and alteration of product information displayed on the ESL devices 108A-108D. The management server 122 may obtain the product information from a product database provided for the ESL devices 108A-108D. That is, the management server 122 may be provided with a database that stores identification information relating to the ESL devices 108A-108D in connection with product information to be displayed on a corresponding one of the ESL devices 108A-108D.

A command message created by the management server 122 (e.g., a product-information change message or a management-information acquisition message) can be transferred to the gateway node 120 using a communication scheme supported by the gateway node 120. The command message may be converted into a packet configured according to the communication scheme and the configured packet may be transferred to the gateway node 120. Furthermore, the management server 122 may receive a reception acknowledgement message sent from the gateway node 120 using the communication scheme. In some cases, the acknowledgement message may be first converted into a message format suitable for reception by the management server 122 before being transferred by the gateway node 120.

In some embodiments, the command messages transmitted by the management server 122 via the gateway node 120 may include various commands for configuring or controlling different components of the ESL system 100 as part of an iterative positioning process for estimating positions of various ESL devices (or "target ESLs") in the ESL system 100, based on the positions of "anchor ESLs" (e.g., the ESL devices 108A-108D). As will be described in further detail below with respect to FIGS. 6 and 10, such commands may include control commands directed to each AP (e.g., each of the APs 106A and 106B) and each ESL device of the ESL system 100 to initiate a positioning session during which the iterative positioning process is performed. Also, as will be described in further detail below, the target ESL devices may include, for example, any new or recently deployed ESL device whose position within the environment is unknown, uncertain, or imprecise (e.g., based on a positioning error that exceeds a maximum positioning error tolerance). The anchor ESL devices may include an initial set of ESL devices (e.g., the ESL devices 108A-108D) installed during the original deployment of the ESL system 100 and whose positions within the environment 110 are known.

Although only one gateway node 120 is shown in FIG. 1B, the ESL system 100 may include several such gateway nodes communicating with the management server 122. Each gateway node 120 analyzes data received from the management server 122, confirms the presence or absence of a message or data to be sent to one or more of the ESL devices 108A-108D, and then sends the confirmed message or data to the appropriate ESL device. For example, the gateway node 120 may configure a message, which is to be sent to the ESL device 108A, into a packet according to a communication scheme and send the configured packet to the ESL device 108A through commanding the AP 106A to transmit the packet. Furthermore, the gateway node 120 may transfer a reception acknowledgement message received from the ESL device 108A through the AP 106A to the management server 122.

Figure 1C:
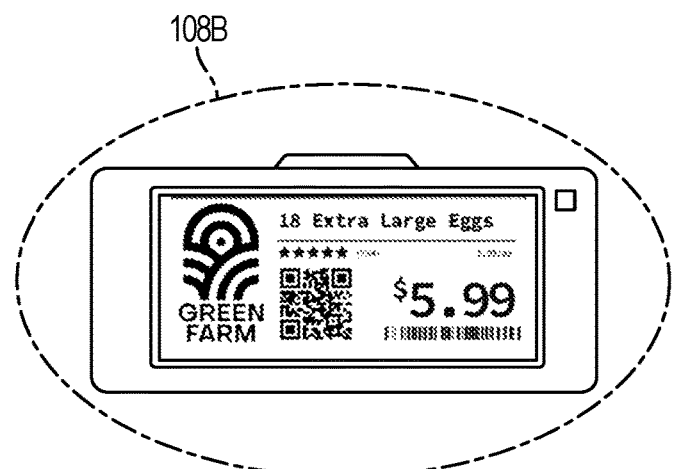
FIG. 1C is a diagram illustrating an example ESL device in the ESL system of FIGS. 1A and 1B according to some embodiments of this disclosure.

Each of the ESL devices 108A-108D may include a display, such as a Liquid Crystal Display (LCD), for displaying data concerning products located on a shelf to which the corresponding ESL device is attached. The information displayed by each of the ESL devices 108A-108D may be received from the gateway node 120. The ESL devices 108A-108D may change price information or be activated or inactivated while communicating with the gateway node 120. A store manager may send the management server 122 a command concerning the synchronization between a product and a specified ESL device and/or a command for the correction of information regarding a product assigned to the particular ESL device. An example of the ESL device 108C is shown FIG. 1C with a display device for displaying product information, such as a product description, a product image, a product price, a product barcode, a product rating, a product Stock Keeping Unit (SKU), and/or a product link (e.g., a URL or QR code).

Each of the ESL device 108A-108D may be configured with a microcontroller including a memory and a microprocessor for performing various operations. The ESL devices 108A-108D may be configured as shown, for example, in FIG. 4, with the microcontroller configured to transmit or receive beacon frames or messages, as will be described further below with reference to FIGS. 6-10.

In some embodiments, a video monitoring system may be included as part of the ESL system 100 or used to augment the capabilities of the ESL system 100. As described above, cameras may be installed on or near the shelves at the ends of the gondolas 112A-112H to capture different views of the aisles between the gondolas 112A-112H and/or other pathways in the areas surrounding the gondolas 112A-112H. For example, shelf cameras 104A-104D may be positioned with a field of view capturing one or more shelves of one or more of the gondolas 112A-112H. The shelf cameras 104A-104D may be used to assist in tracking stock levels and/or identifying items picked by users while in the environment. Also, as described above, OTT cameras 102A-102D may be positioned with a field of view capturing large regions of the retail environment 110. The visual information (e.g., images and/or video) captured by the OTT cameras 102A-102D and the shelf cameras 104A-104D may be transmitted to the management server 122 for processing.

In some implementations, the management server 122 may apply object recognition models or systems to the image frames received from the OTT cameras 102A-D and/or shelf cameras 104A-D to determine a presence of, or count of, people and objects (including products and ESL devices on shelves) located in the field of view of a respective camera. For example, the OTT cameras 102A-102D and/or shelf cameras 104A-D may be used to support the determination of the positions of the ESL devices 108A-108D, the BLE device 124, and/or other devices within the retail environment 110.

Figure 2A:
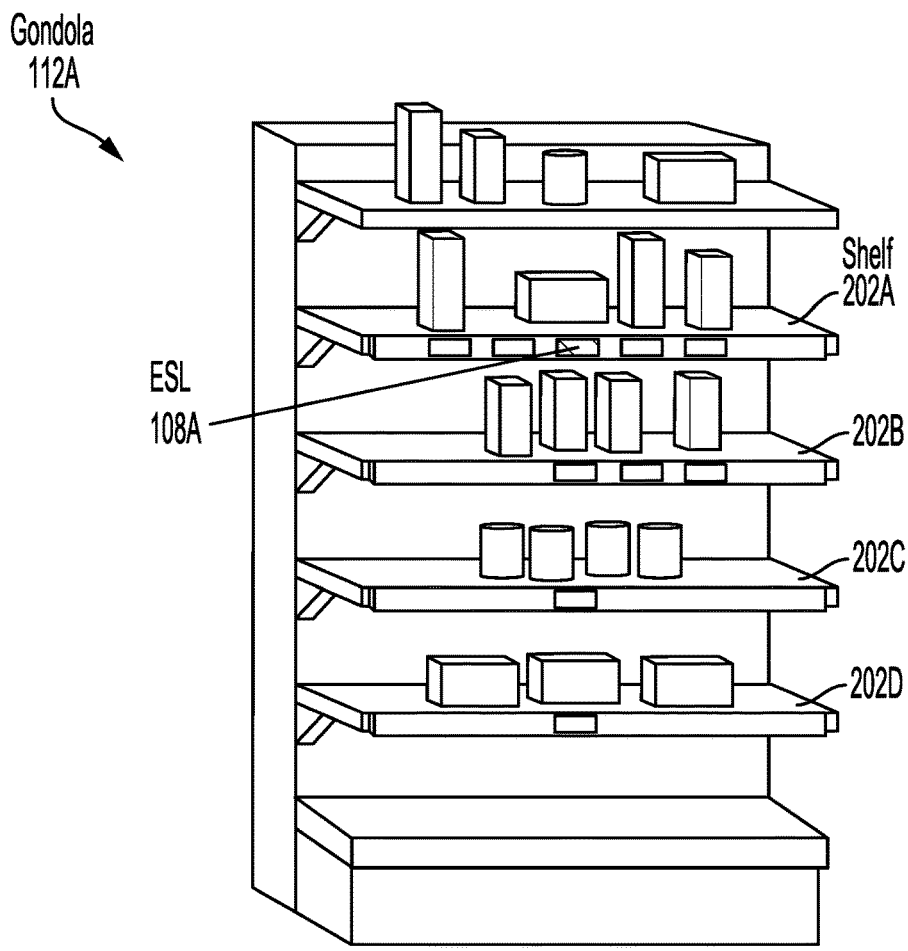
FIG. 2A is a perspective view of a gondola including multiple shelves with ESL devices according to some embodiments of this disclosure.

As described above, the retail environment 110 associated with the ESL system 100 may include ESL devices organized on gondolas and shelves. One example of such a gondola is shown in FIG. 2A. FIG. 2A is a perspective view of gondola 112A with ESL devices according to some embodiments of the disclosure. The gondola 112A may include multiple shelves 202A-202D at different vertical levels from a floor. ESL devices may be attached to the shelves 202A-202D. For example, ESL device 108A may be attached to shelf 202A to display information regarding products stocked on shelf 202A in the vicinity of the ESL device 108A.

Figure 2B:
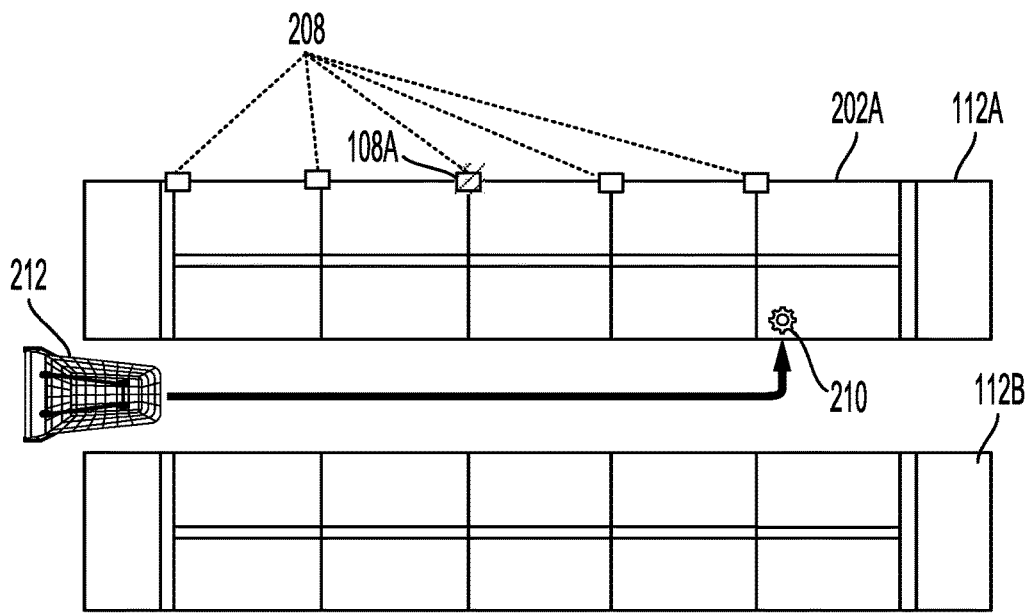
FIG. 2B is a top-down view of an aisle between different gondolas with ESL devices accessible to a user within a retail environment according to some embodiments of this disclosure.

The ESL devices may provide information to a shopper or store employee operating in the environment, such as to provide information regarding products and/or assist with location determination of products or the user. FIG. 2B is a top-down view of an aisle between gondolas 112A and 112B with ESL devices on the shelves of each gondola accessible to a user according to some embodiments of the disclosure. As shown in FIG. 2B, gondola 112A may include a dense deployment of ESL devices 208 (including the ESL device 108A) with adjacent ESL devices uniformly spaced along shelf 202A. Additional ESL devices may be similarly positioned along other shelves of gondola 112A and the shelves of gondola 112B. A user pushing a shopping cart 212 through the aisle may use ESL devices 208 to determine the location of a particular product. For example, a mobile device associated with the shopping cart 212 may use RF measurements of radio signals broadcasted by the ESL devices 208 (and/or other ESL devices located nearby) to estimate a current location of the user (and shopping cart 212) within the environment and guide the user to a location 210 of a desired product on the appropriate shelf of gondola 112A.

Figure 3:
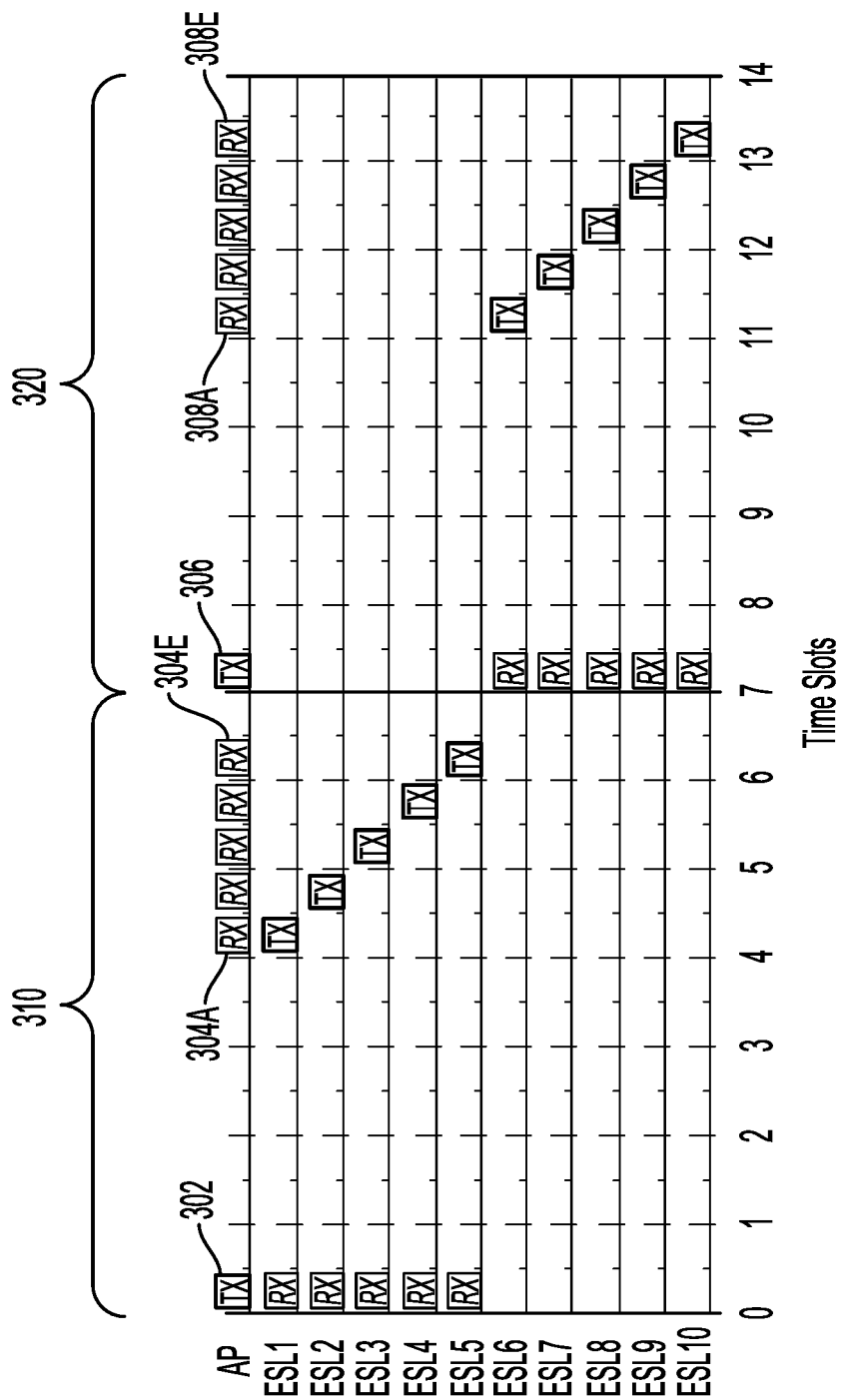
FIG. 3 is a timing diagram illustrating time division multiplexing for communicating with multiple ESL devices according to some embodiments of this disclosure.

Communication between an AP, such as AP 106A, and ESL devices, such as ESL devices 108A-108D, within the ESL system 100 may be performed according to a Time Division Multiple Access (TDMA) scheme, as illustrated in FIG. 3. FIG. 3 is a timing diagram illustrating time division multiplexing for communications between an AP and various ESL devices within an ESL system according to some embodiments of the disclosure. As shown in FIG. 3, an AP and each ESL device of the ESL system may be allocated one of various time periods or slots for transmitting or receiving information. It should be appreciated that a similar TDMA scheme may be used for communications between different ESL devices.

In ESL systems with significant numbers of ESL devices, the ESL devices may be configured to communicate with the AP in different groups, where each group may correspond to a different time frame. For example, a first group of ESL devices (ESL1-ESL5) in FIG. 3 may be configured to communicate with the AP during a first time frame 310, and a second group of ESL devices (ESL6-ESL10) may be configured to communicate with the AP during a second time frame 320. The first and second time frames 310 and 320 may alternate during operation of the wireless network. The AP in this example may transmit or broadcast information that is received by the first group of ESL devices during a first time period (or time slot) 302 in the first time frame 310. The ESL devices in this first group may transmit information to the AP during subsequent time periods/slots in the time frame 310. For example, the first ESL device (ESL1) may transmit information received by the AP during a time period 304A, with the other ESL devices (ESL2-ESL5) in this group transmitting during time periods 304B-304E, respectively, in the time frame 310. Likewise, the AP may transmit information received by the second group of ESL devices during a time period 306 in the second time frame 320. The ESL devices (ESL6-ESL10) in this second group may transmit information received by the AP during respective time periods 308A-308E in the time frame 320.

Figure 4:
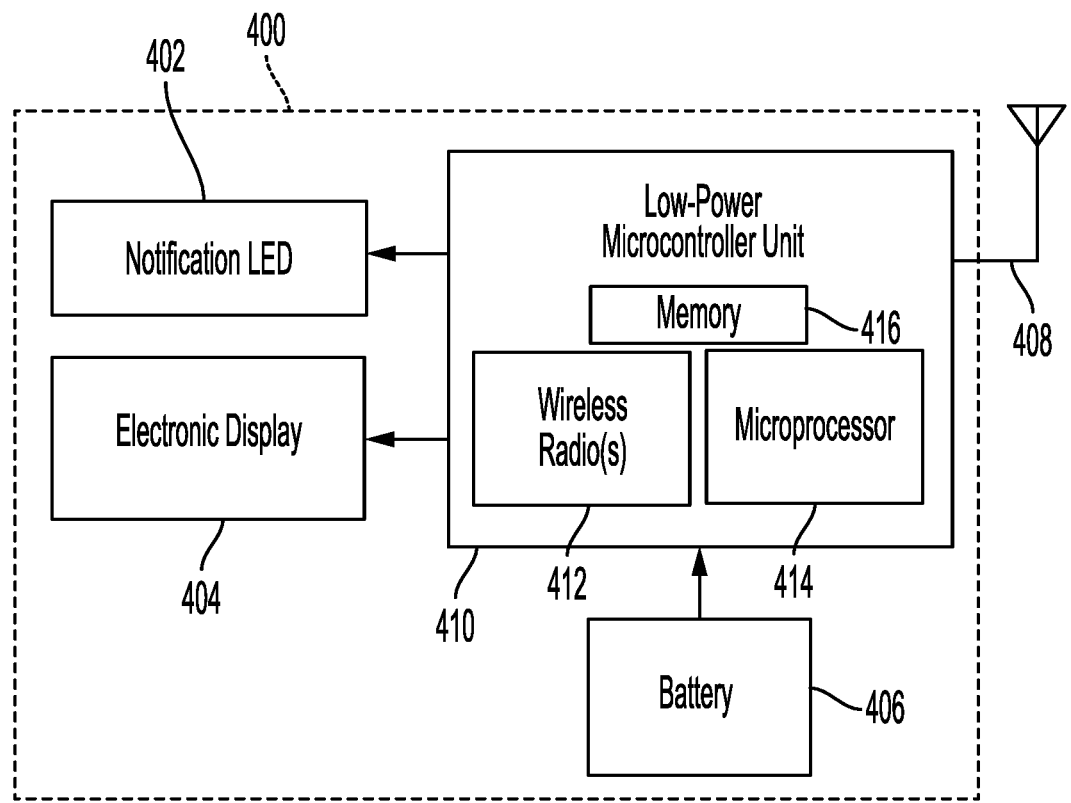
FIG. 4 is a block diagram illustrating an example of an ESL device according to some embodiments of this disclosure.

An ESL device may include components configured together to provide some or all of the functionality described in this disclosure and/or provide additional functionality. FIG. 4 is a block diagram illustrating an example ESL device 400 according to some embodiments of this disclosure. For example, the ESL device 400 may be used to implement each of the ESL devices (including the ESL devices 108A-108D) of the ESL system 100 described above with respect to FIGS. 1A-2B. The ESL device 400 may include a low-power microcontroller 410. Although functionality for the ESL device may be configured by the microcontroller 410 in embodiments of this disclosure, any single or combination of processors (e.g., at least one processor) may be used to perform the functions described according to embodiments of this disclosure.

The microcontroller 410 may include a memory 416. The memory 416 may store computer program code that causes a microprocessor 414 to execute operations that carry out some or all of the functionality described with respect to various embodiments of this disclosure. Although shown as part of the microcontroller 410, the memory 416 may be located internal to or external to the microcontroller 410. The microcontroller 410 may also include one or more wireless radio(s) 412. The wireless radios 412 may include, for example, a Bluetooth wireless radio including a front end that couples to antenna 408 for transmitting and receiving radio frequency (RF) signals at one or more frequencies in one or more frequency bands. In some embodiments, the microcontroller 410 is a System on Chip (SoC) in which two or more components of the wireless radio(s) 412, the microprocessor 414, and/or the memory 416 are included in a single semiconductor package. In some embodiments, the two or more components may be included on a single semiconductor die.

The ESL device 400 may include I/O devices, such as a notification LED 402 and/or an electronic display 404. The notification LED 402 may include one or more light emitting diodes (LEDs), or other light sources configured to flashlight of one or more colors. The notification LED may be triggered to blink at a specific time and/or with a specific color based on a command received from the gateway node 120. For example, a notification LED 402 may blink to attract a user's attention to a particular location on a shelf. The electronic display 404 may be, for example, an electronic-ink (e-Ink) display configured to output the product information.

The ESL device 400 may couple to a battery 406 or other power source to power operations performed by the ESL device 400, such as to operate the wireless radio(s) 412, the notification LED 402, the electronic display 404, the memory 416, and/or the microprocessor 414. The battery 406 may allow placement of the ESL device 400 in a place where constant power supply is difficult. Thus, in order that a single battery charge provides a long period of use (e.g., lasting longer than several years), the ESL device 108 may be configured to reduce power consumption during times when frequent commands are not expected. For example, the ESL device 400 may operate using a wakeup communication scheme. That is, the ESL device 400 wakes up according to predetermined time intervals to determine whether data is waiting to be received. When no data is waiting, power to the ESL device 400 is turned off until the next wakeup period to reduce power consumption. When there is data to be received, the ESL device 400 wakes up to perform communication operations. In some embodiments, the ESL device 400 may wake up in response to receiving a command message from an AP (e.g., AP 108A of FIG. 1B, as described above) or a management server (e.g., management server 122 of FIG. 1B) of the ESL system.

Returning to the example ESL system 100 of FIG. 1B, the management server 122 may generate and transmit command messages directed to the ESL devices 108A-108D and other ESL devices in the environment 110 via the gateway node 120. As described above, such command messages may include commands for configuring or controlling different components of the ESL system 100 as part of an iterative positioning process to estimate the unknown or uncertain positions of various target ESL devices of the ESL system 100 based on the known positions of anchor ESL devices (e.g., the ESL devices 108A-108D).

For example, the positions of the ESL devices 108A-108D (and other anchor devices or nodes of the ESL system 100) may be known because they were manually entered into the ERP inventory management system by a user, e.g., a store worker, via a user interface of the management server 122. These positions may be stored in a database of the ERP system during an initial deployment of the ESL system 100. The positions of the ESL devices 108A-108D may have been determined by the user in this example using any of various techniques, such as through physical measurement and calibration by either the user or a robot, such as an autonomous guided vehicle (AGV) or an autonomous mobile robot (AMR). The known positions may also be determined based on RF measurements collected for each device during the initial deployment. The type of signals may vary depending on the existing technology infrastructure of the retail environment 110. The infrastructure may include, for example, Wi-Fi access points, cameras (e.g., OTT cameras 102 and shelf cameras 104A-104D), a global navigation satellite system (GNSS) antenna, and 5G NR transmission reception points (TRPs).

The known position data associated with each of the ESL devices 108A-108D may include, for example, x-y-z coordinates corresponding to the location of the device in a three-dimensional (3D) grid representing the retail environment 110. Additionally or alternatively, the position data may include x-y coordinates corresponding to a relative location of the device on a two-dimensional (2D) grid representing one or more shelves of a gondola (e.g., gondola 112A) to which the device is attached. The position data may further include a coarse location of the device that identifies a particular aisle, gondola, and/or shelf where the device is located within the retail environment 110. This coarse location may then be used to refine the estimated location of nearby target ESL devices during successive iterations of the disclosed iterative positioning techniques, as will be described in further detail below.

The position of each target ESL device may be estimated based on RF measurements of positioning signals exchanged between the target ESL device and one or more anchor ESL devices. In some embodiments, all of the ESL devices may be ranked according to the relative accuracy of the position associated with each device. As the positions of anchor devices, such as ESL devices 108A-108D, are already known, each of these devices may be considered to have an absolute position and therefore, be assigned the highest ranking (e.g., a rank of 1).

The ranking of each target device, however, may vary according to a level of error or uncertainty associated with the estimated position of that device. For example, a positioning error may be determined for the estimated position of each target device based on the relative strength or quality of the positioning signals collected by that device from the anchor or rank-1 ESL devices (e.g., based on geometric dilution of precision (GDOP) values, a signal-to-noise ratio (SNR), or other quality metric associated with the measured signals). For example, the strength or quality of radio signals measured by a target ESL device may be affected by GDOP depending on the device's location relative to that of the anchor device that transmitted the signals. Therefore, to improve signal quality and reduce positioning error, at least one anchor ESL device in a vicinity of the target ESL device that forms a favorable geometry (e.g., whose known position is at a certain angle that lowers GDOP) with respect to the estimated position of the target ESL device may be identified. The management server 122 in this example may transmit a command to the identified anchor device(s) to broadcast radio signals for measurement by the target ESL device (e.g., during a second iteration of a positioning session initiated between the target and anchor devices within the environment 110). Additional iterations of the positioning session may be performed to further refine the estimated position of the target ESL device until the positioning error falls below a maximum positioning error tolerance. The position of the target device estimated at each iteration may be based on additional positioning measurements of signals transmitted by one or more anchor devices with favorable geometry in the vicinity of the estimated position from a previous iteration.

In some implementations, a position estimate for each target ESL device may be determined based on a weighted average of the anchor ESL device positions, where the weights may be a function of received signal strength indicator (RSSI) measurements calculated for the radio signals received from each anchor device. In some embodiments, each of the target ESL devices may be assigned a rank on the basis of the level of uncertainty or error in the position estimate and/or quality of the RSSI measurements used to estimate the position. The ranking may be based on, for example, a set of quantization bins representing different signal strength levels may be defined, where each bin corresponds to a range of RSSI values. The RSSI measurement or set of measurements collected by each device may be mapped to the appropriate quantization bin based on the corresponding RSSI values. Each ESL device may then be assigned a rank based on the quantized RSSI data, for example, based on an average quantized RSSI value associated with each ESL device, where target ESL devices having higher average RSSI values may be ranked higher because they generally have a stronger signal strengths relative to neighboring devices. As will be described in further detail below with reference to FIG. 5, the positioning and/or ranking of target ESL devices may be performed over a plurality of iterations until the positioning error determined for each target device is less than a maximum positioning error tolerance (or all the target devices achieve an acceptable ranking).

Figure 5:
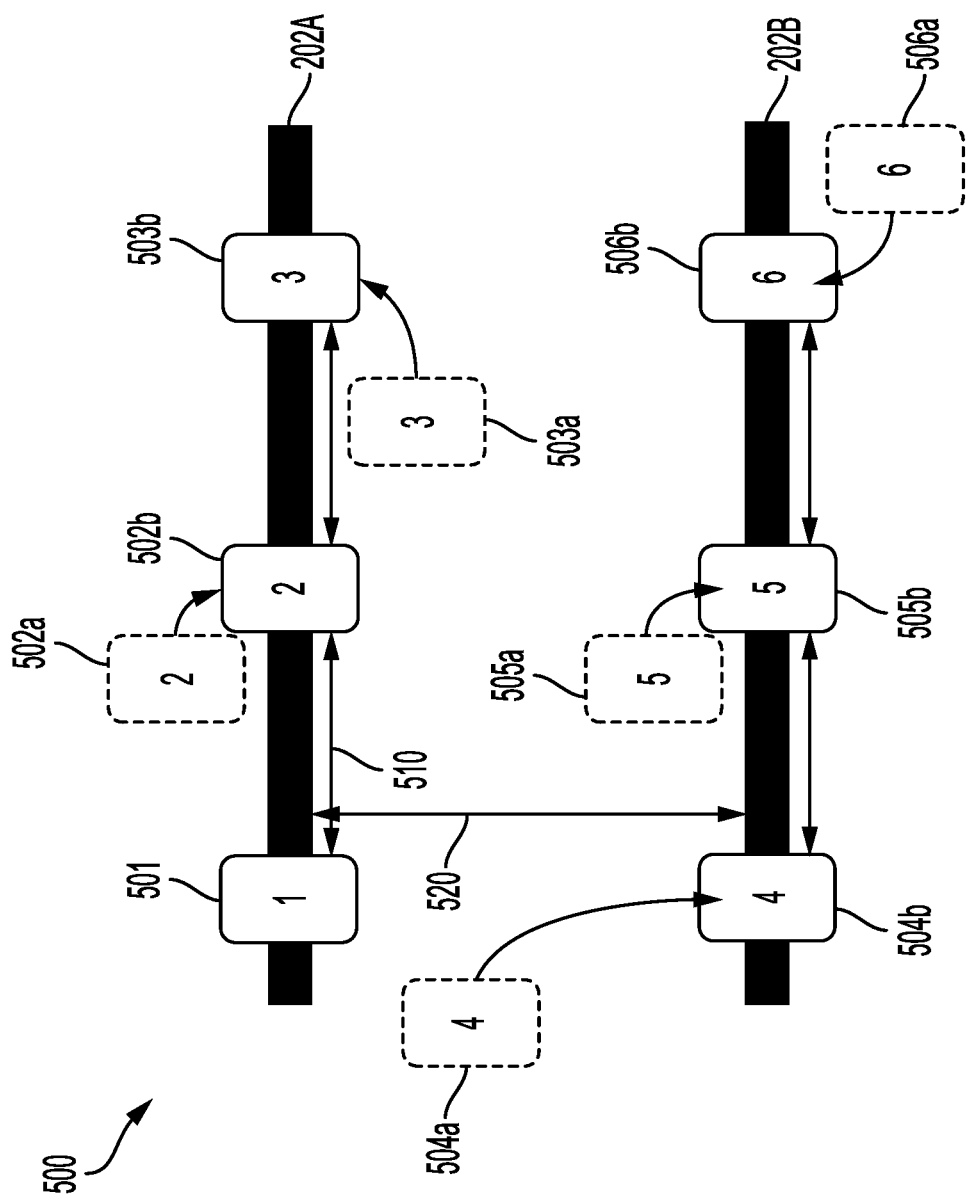
FIG. 5 is a diagram illustrating an example process of iteratively positioning ESL devices within an indoor environment according to some embodiments of this disclosure.

FIG. 5 is a diagram illustrating an example process 500 of iteratively positioning ESL devices within an indoor environment (e.g., retail environment 110 of FIG. 1B, as described above) according to some embodiments of this disclosure. While only ESL devices 1-6 are shown in FIG. 5, the iterative positioning techniques disclosed herein may be applied to any number of ESL devices. ESL device 1 in the example of FIG. 5 may represent an anchor (or rank-1) node or device of the ESL system whose position within the environment is known. ESL device 1 may correspond to, for example, ESL device 108A attached to shelf 202A of gondola 112A, as described above with respect to FIG. 2A. ESL devices 2-6 may represent unranked target nodes or devices of the ESL system that have unknown or uncertain positions along either shelf 202A or shelf 202B.

During a first iteration of process 500, a position or location of each of the target ESL devices 2-6 may be estimated based on positioning measurements (e.g., RSSI and/or other RF measurements) of radio signals received from the anchor ESL device 1 located at a position 501 along the shelf 202A. For example, after the first iteration, target ESL devices 2 and 3 may be estimated to be at positions 502a and 503a along the shelf 202A, and target ESL devices 4, 5, and 6 may be estimated to be at positions 504a, 505a, and 506a, respectively, along the shelf 202B.

As described above, a positioning error associated with the estimated position of each target device may also be determined. Each of the target ESL devices 2-6 may also be assigned a rank based on the quality of the positioning measurements collected by that device and/or a level of uncertainty or positioning error associated with the corresponding position estimate, as described above. The position estimate may vary depending on the quality of the signals received by that device (e.g., based on SNR or other signal quality metric) and/or the degree to which the device is affected by GDOP. To reduce the positioning error and thereby improve the accuracy of the position estimates, additional positioning (RF) measurements may be exchanged and collected by each of the target devices 2-6 during one or more subsequent iterations of process 500. For example, after the subsequent iteration(s), target ESL devices 2 and 3 may be estimated to be at positions 502b and 503b along the shelf 202A, and target ESL devices 4, 5, and 6 may be estimated to be at positions 504b, 505b, and 506b, respectively, along the shelf 202B.

Additional iterations (e.g., up to a desired threshold number for a particular implementation) may be performed until the positioning error associated with the estimated position of each target device is less than a maximum positioning error tolerance or until all the target ESL devices 2-6 are assigned an acceptable ranking or position estimate. In some implementations, the position estimates may be averaged over multiple iterations (and time) to improve accuracy. In some cases, any target ESL devices that still have a low ranking or position estimate with a positioning error that is greater than the maximum positioning error tolerance after multiple iterations may be manually or individually positioned or calibrated, e.g., by a store worker or automated robot (e.g., the AGV or AMR described above). For example, a notification identifying the target ESL device that requires manual positioning or calibration may be transmitted to a user device associated with the ESL system or indoor environment.

In some embodiments, the position estimation accuracy may be improved based on additional information regarding a known infrastructure or layout of the ESL system as deployed within the environment. Such information may reveal, for example, that ESL devices of the ESL system are deployed within the environment according to a standardized topology in which adjacent ESL devices are uniformly spaced horizontally on the same shelf and vertically across different shelves. For example, the ESL devices may be positioned along their respective shelves 202A and 202B according to a uniform horizontal spacing 510 between adjacent ESL devices on the same shelf (such as ESL device 1 and ESL device 2 on shelf 202A) and a uniform vertical spacing 520 between adjacent ESL devices on different shelves (such as ESL device 1 on 202A and ESL device 4 on shelf 202B). This information may be used to resolve ambiguities and perform corrections. This information may also enable positioning estimation errors or inaccuracies to be interpreted as part of a matching problem, where a best-fit approach (that can be solved using numerical computations) may be found given a known topology of the ESL devices.

In addition to, or as an alternative to, using ESL topology information, a coarse location of each of the ESL devices 1-6 may be used to reduce positioning error and improve the accuracy of the estimated position at each iteration. For example, each ESL device may be associated with a unique device identifier (such as a MAC address, ESL identification (ID) number, etc.) along with one or more identifiers corresponding to its coarse location (such as a shelf number, gondola number, and/or aisle number) within the environment. These identifiers may be entered for each ESL device by a user (such as a store worker) into an ERP inventory management system during the initial installation or deployment of the ESL device within the environment, as described above. The coarse location identifier(s) may be used to identify one or more anchor ESL devices (such as ESL device 1) located in the vicinity (e.g., same aisle, gondola, or shelf) as the target ESL devices (such as ESL devices 2-6) and trigger positioning transmissions from the identified anchor device(s) for measurement by the target ESL devices. Given the proximity of the identified anchor ESL device(s) relative to each target ESL device, the positioning transmissions will likely form a more favorable geometry with less GDOP. The GDOP may include, for example, horizontal GDOP, vertical GDOP, and/or GDOP that may be expressed in terms of signal propagation planes formed by the aisles (e.g., parallel or perpendicular to each aisle).

In some embodiments, the iterative positioning process may be performed for target ESL devices corresponding to one or more shelves or an entire gondola, which has been moved or reorganized (e.g., as part of shifting inventory, changing the layout of the store, making space for new shelves). The nature of this reorganization may be known a-priori, e.g., based on information stored in an ERP inventory management system accessible to the management server 122, as described above. The ERP system may identify, for example, any ESLs that will be moved (i.e. whose positions are expected to be altered), any ESLs whose relative locations to one another will be unaffected (e.g., ESLs located on an entire row, shelf, or gondola that will be moved), a direction vector in which the ESLs will be moved (for instance, if a gondola is rotated 90 degrees), and the new location of a reference point (such as a corner of the gondola), if available, for any ESL that is manually positioned. In some cases, this information may be relayed to the corresponding ESL AP associated with the affected ESLs, which in turn may trigger a self-positioning session for the affected ESLs. Furthermore, any prior knowledge regarding the reorganization of ESL devices may be used to compute new locations of the affected ESLs. For example, in the case of a known direction vector or location of a reference point, an offset may be added to the previous location of each affected ESL to obtain its new location.

In some embodiments, each iteration of the positioning process for estimating positions of target ESL devices may be performed as part of a positioning session triggered by a server of the ESL system (e.g., the management server 122 of FIG. 1B), as will be described in further detail below with respect to FIG. 6.

Figure 6:
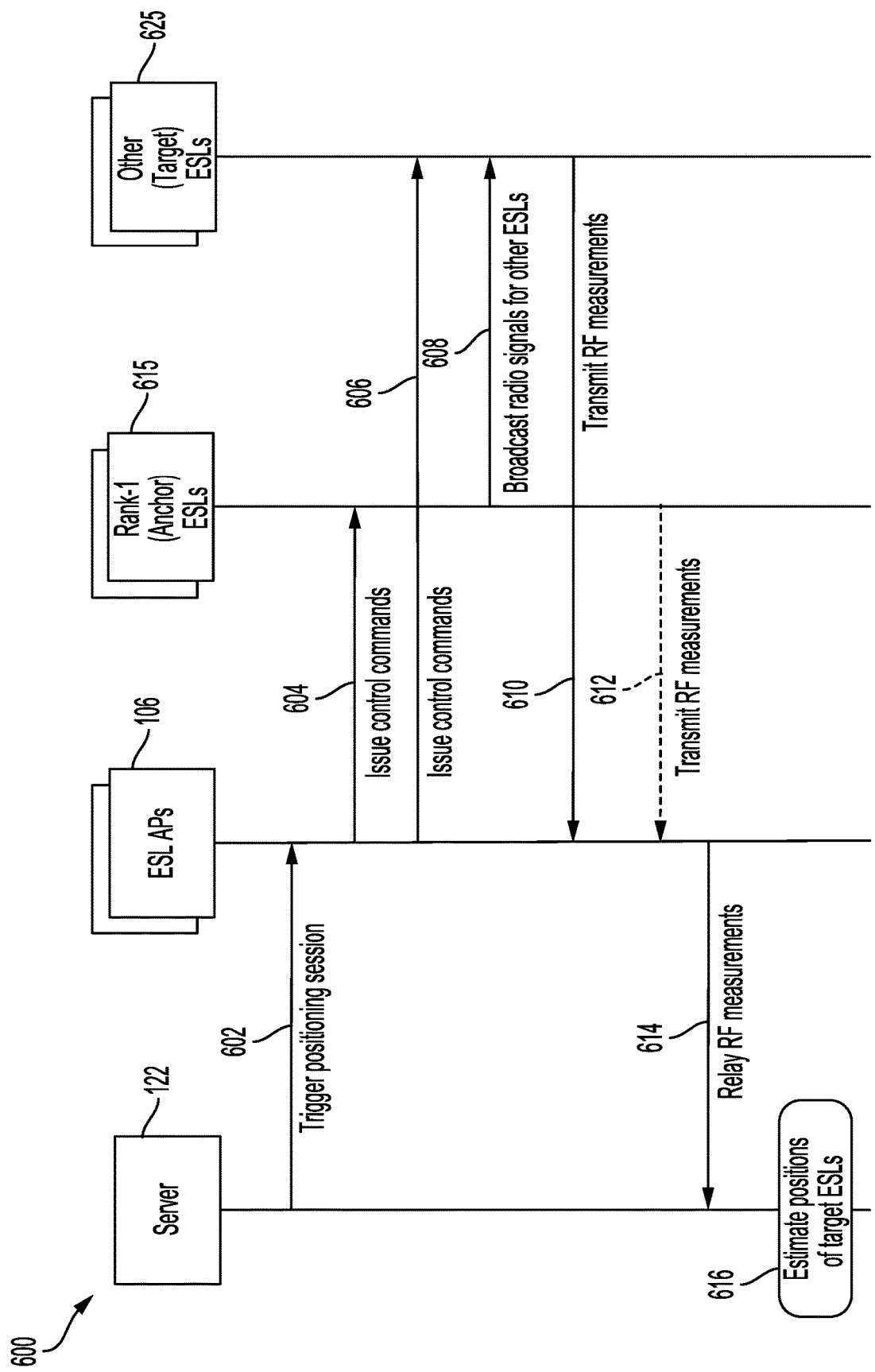
FIG. 6 is a signaling diagram illustrating an example communication flow between different components of an ESL system during a positioning session for estimating positions of ESL devices within an indoor environment according to some embodiments of this disclosure.

FIG. 6 is a signaling diagram illustrating an example communication flow 600 between different components of an ESL system during a positioning session for estimating positions of target ESL devices (or target ESLs) 625 within an indoor environment based on the known positions of anchor ESLs 615 according to some embodiments of this disclosure. The known positions of anchor ESLs 615 may be determined by the server 122 based on information stored for these ESLs in an ERP system accessible to the server 122, as described above. For discussion purposes, communication flow 600 will be described using components of the ESL system 100 of FIG. 1B, as described above, but communication flow 600 is not intended to be limited thereto.

As shown in FIG. 6, communication flow 600 begins at step 602, in which the server 122 may trigger a positioning session, for example, by sending an initial command to each of the APs 106A and 106B (or "ESL APs 106" collectively). In some implementations, the initial command may be sent via a gateway node (e.g., gateway node 120 of FIG. 1B, as described above) of the ESL system.

At 604, the APs 106 may issue control commands to the rank-1 or anchor ESLs 615 (e.g., including ESL devices 108A-108D of FIG. 1B, as described above) within the environment. At 606, the APs 106 may issue similar control commands to other ESLs (i.e., target ESLs) 625 within the environment. The control commands sent by the APs 106 may include, for example, scheduling information with time slots for transmitting and receiving radio signals (e.g., beacon messages or frames) according to a Time Division Multiple Access (TDMA) scheme, a Frequency Division Multiple Access (FDMA) scheme, or a combination of TDMA and FDMA. For example, the scheduling information included in the control commands sent by the APs 106 to the anchor ESLs 615 and the target ESLs 625 may include appropriate time slots for each device to transmit and/or receive radio signals (e.g., beacon frames) over a period of time, as shown in FIG. 7.

Figure 7:
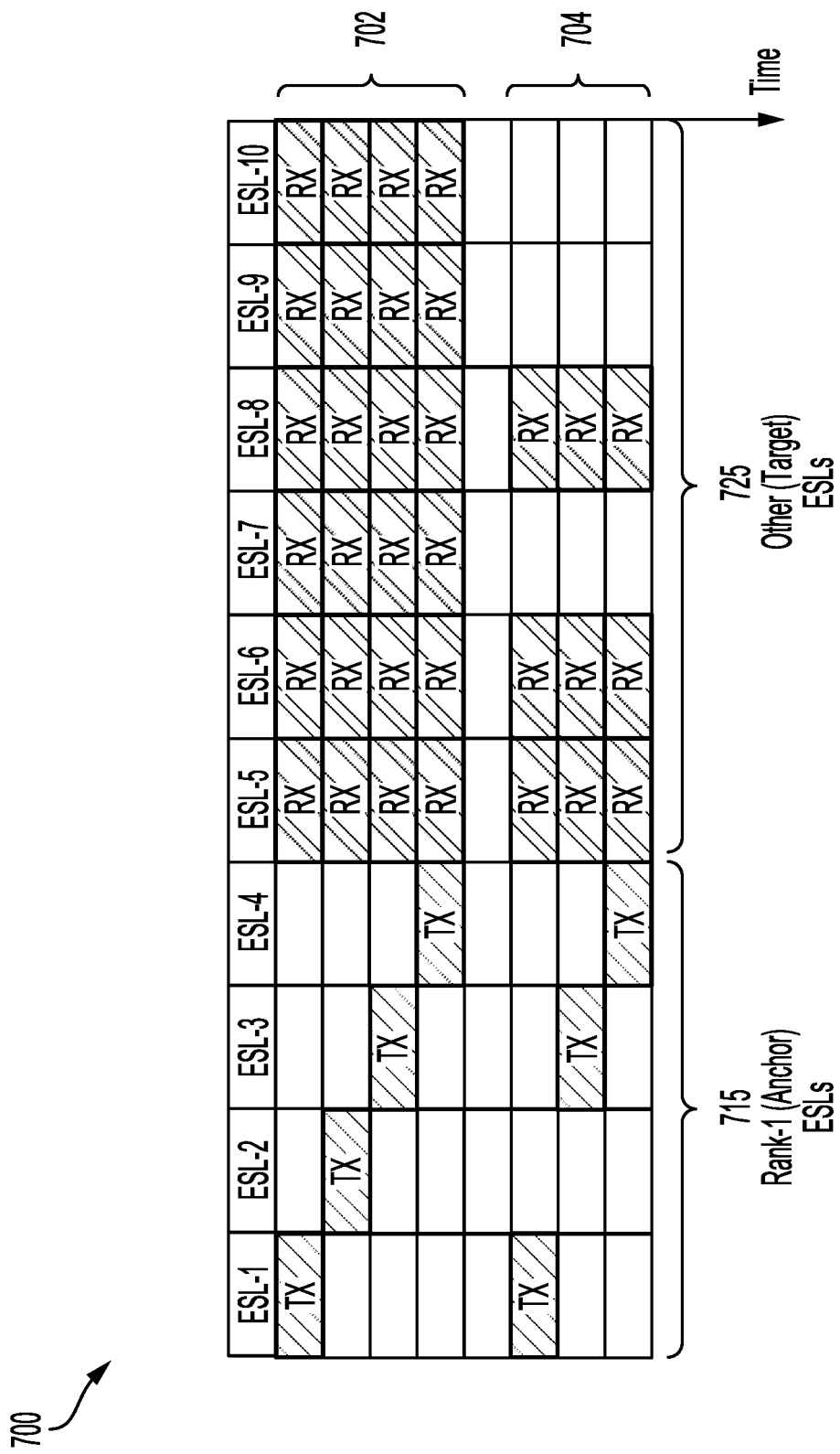
FIG. 7 is a timing diagram illustrating time division multiplexing for communications between rank-1 ("anchor") ESL devices and other ("target") ESL devices according to some embodiments of this disclosure.

FIG. 7 is a diagram of a TDMA schedule 700 illustrating time division multiplexing for communications between rank-1 (anchor) ESLs 715 and other (target) ESLs 725 according to some embodiments of this disclosure. As shown in FIG. 7, the TDMA schedule 700 may be used to allocate a time slot for each of the anchor ESLs 715 (ESL-1 to ESL-4) to transmit signals (e.g., beacon frames) along with a time slot for each of the target ESLs 725 (ESL-5 to ESL-10) to receive signals over different time frames. For example, all target ESLs 725 may be placed in a receive (Rx) mode for receiving signals from each of the anchor ESLs 715 placed in a transmit (Tx) mode at respective time slots over a first time frame 702. By contrast, only a subset of the target ESLs 725 (e.g., ESL-5, ESL-6, and ESL-8) may be allocated time slots to receive signals from a subset of the anchor ESLs 715 (e.g., ESL-1, ESL-3, and ESL-4) over a second time frame 704. In some implementations, multiple transmissions may be multiplexed or overlapped over a common channel supported by a particular communication standard (such as a common advertising channel under the Bluetooth standard).

Returning to FIG. 6, the anchor ESLs 615 at 608 may begin broadcasting the radio signals to be received and measured by the other (target) ESLs 625 in accordance with the scheduling information received at 604 from the APs 106.

At 610, the target ESLs 625 may transmit the RF measurements of the received signals to the appropriate ESL APs 106. In some implementations, communication flow 600 may include an optional step 612 at which the anchor ESLs 615 also transmit RF measurements to the ESL APs 106 based on radio signals received from the target ESLs 625. At 614, the ESL APs 106 may relay the RF measurements received from at least the target ESLs 625 to the server 122. At 616, the server 122 may use the received RF measurements to estimate positions of the target ESLs 625.

The server 122 at 616 may also determine a positioning error representing a level of uncertainty associated with the estimated position for each of the target ESLs 625. In some implementations, the server 122 may assign a rank to each of the target ESLs 625 based on the positioning error or uncertainty. If the positioning error is greater than a maximum positioning error tolerance, the communication flow 600 may be repeated for one or more additional positioning sessions triggered by the server 122 for performing one or more subsequent iterations of the positioning process until the positioning error associated with each of the estimated positions is less than the positioning error tolerance, as described above.

In some implementations, the control commands transmitted by the APs 106 to the ESL devices 615 and 625 may be part of a beacon message inside a synchronization packet that is periodically broadcasted by the APs 106. An example of such a beacon message is shown in FIG. 8A.

Figure 8A:
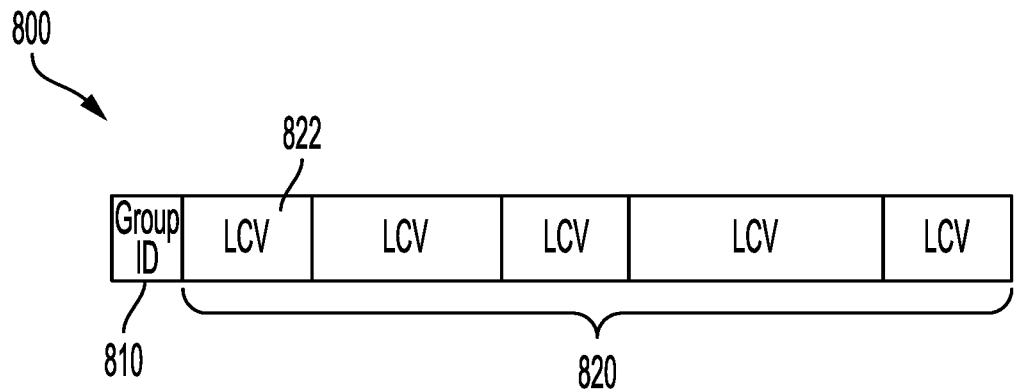
FIG. 8A is a block diagram illustrating an example of an access point (AP) beacon message including an ESL payload for a group of ESL devices according to some embodiments of this disclosure.

FIG. 8A is a block diagram illustrating an example of an AP beacon message 800. As shown in FIG. 8A, the AP beacon message 800 includes a group identifier (ID) field 810 and an ESL payload 820. The group ID in field 810 may be assigned to a group of one or more ESL devices (such as a group of one or more target ESLs). The ESL payload 820 may include a sequence of control commands, where each command is in an "Len Cmd Value" (or "LCV") format. The LCV commands in this example may be intended for each ESL within the group specified by the group ID in field 810. It should be appreciated that a group in this context may comprise just one ESL device.

Figure 8B:
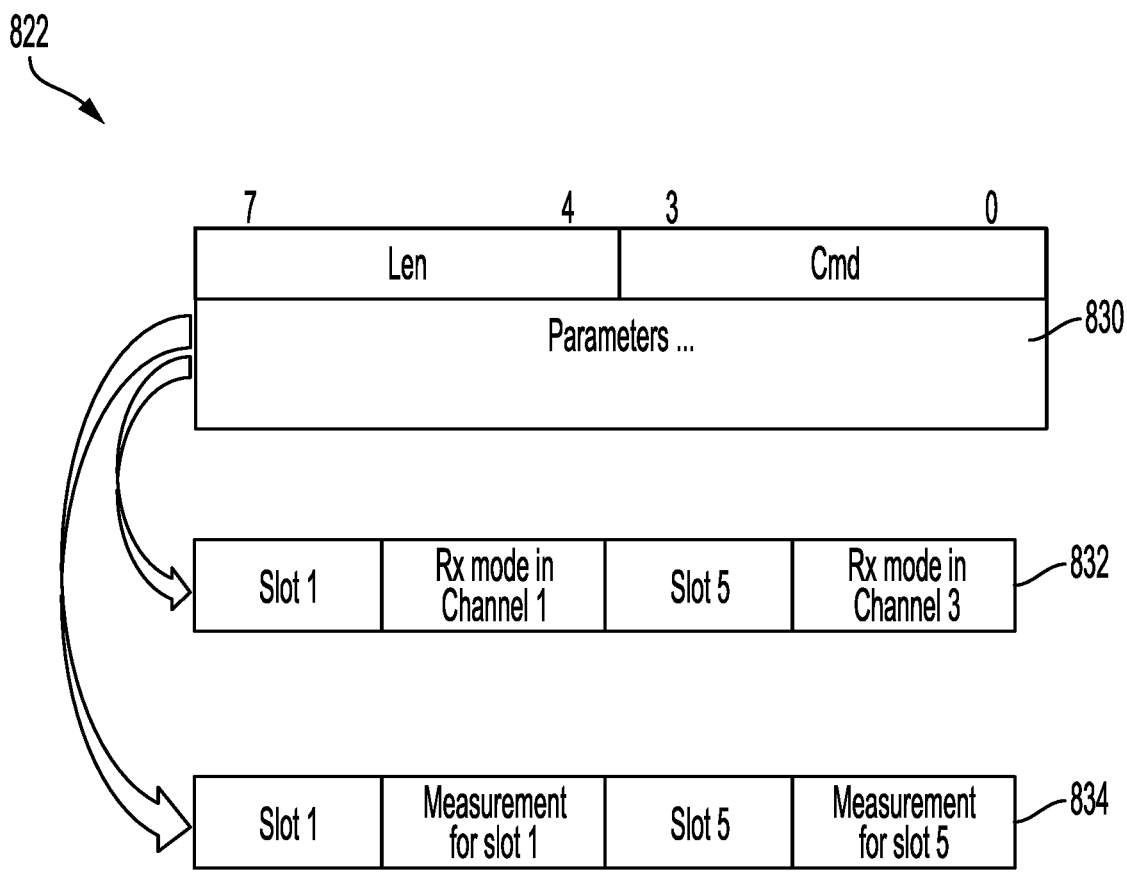
FIG. 8B is an example format of a control command for the group of ESL devices of FIG. 8A according to some embodiments of this disclosure.

FIG. 8B shows an example format of an LCV command 822 that may be included in the ESL payload 820 of beacon message 800. The LCV command 822 may include various commands intended for each ESL device in the group of ESL devices corresponding to the group ID specified in the group ID field 810 of the beacon message 800 of FIG. 8A. As shown in FIG. 8B, the LCV command 822 may include parameters 830 for controlling device operation and the timing for sending and receiving communications. For example, the parameters 830 may include a command that places a subset of target ESLs (corresponding to the group ID) within an indoor environment into a sleep mode for a specified period of time. In sleep mode, each device stops attempting to receive and decode every beacon message that may be transmitted over a particular channel or during a beacon interval, which helps to conserve the device's battery power. To reactive the device, a wake-up period may be included in the parameters 830 of the LCV command 822.

In some embodiments, the parameters 830 of the LCV command 822 may include a parameter 832 that specifies a set of channels (and corresponding time slots) for the subset of ESLs to listen to while operating in a receive mode. Additionally, a parameter 834 may specify time slots for response messages to be transmitted by each device via a communication uplink to an appropriate AP of the ESL system, where each transmitted message must include measurement data specific to the slots that were listened to or scanned while the device was operating in receive mode.

In some embodiments, the LCV command 822 may specify parameters for a 5G New Radio (NR) sidelink (SL) positioning reference signal (PRS) configuration. Accordingly, the positioning session may be a SL PRS ranging session initiated based on the SL PRS configuration transmitted to each ESL device in a set of ESL devices corresponding to a particular group ID. In some cases, the group ID may correspond to a combined set of ESL devices that includes both rank-1 (anchor) and other (target) ESLs.

Figure 9A:
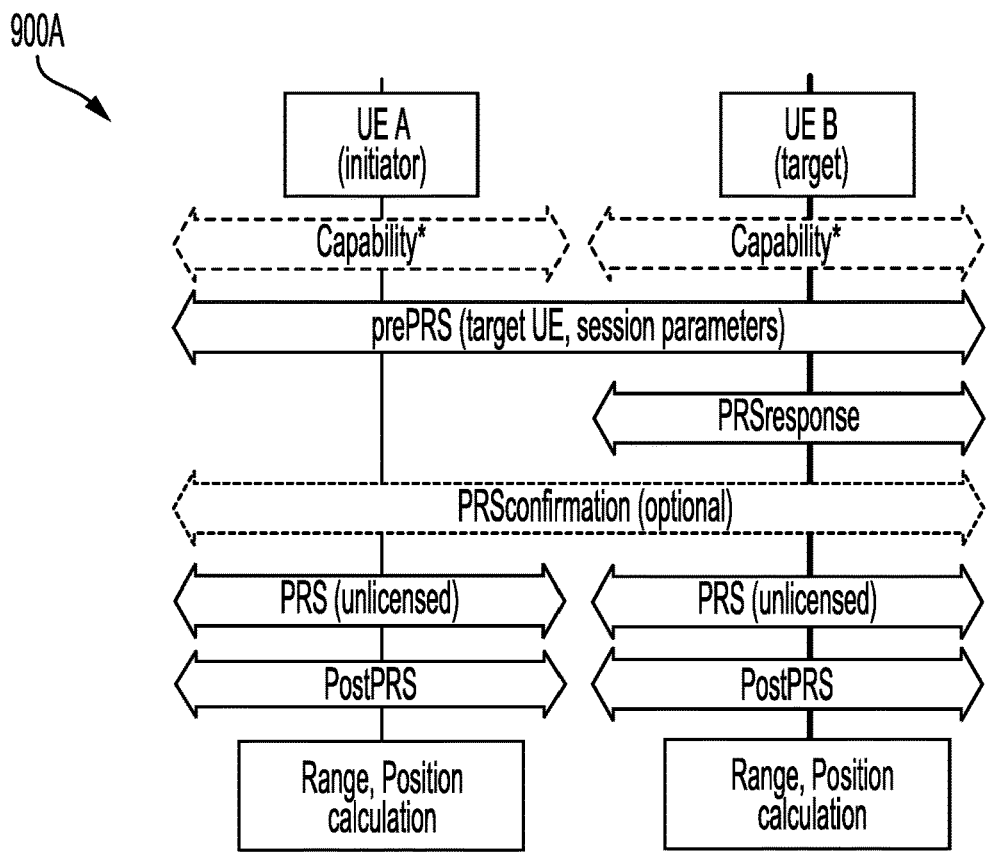
FIG. 9A is a flow diagram of an example process for positioning user equipment (UE) based on positioning reference signal (PRS) measurements exchanged between an initiator UE and a target UE during a 5G New Radio (NR) Sidelink (SL) ranging session according to some embodiments of this disclosure.

FIG. 9A is a flow diagram of an example process 900A for positioning user equipment (UE) based on PRS measurements exchanged between an initiator UE and a target UE during a 5G NR-SL ranging session according to some embodiments of this disclosure. As shown in FIG. 9A, process 900A may begin with the initiator and target UEs exchanging information regarding each device's capability (such as whether the device include support for unlicensed bands). Next, the initiator UE may send a pre-PRS message specifying various session parameters (e.g., session ID, PRS channel, and one or more transmission time slots) to the target UE. The target UE may respond with a PRS response message acknowledging that is available for PRS transmissions during the specified time slot(s). An optional PRS confirmation message may be exchanged that confirms the session with or without any further modification. Following confirmation, post-PRS messages (e.g., including PRS measurements, UE location, and UE motion state) may be exchanged between the initiator and target devices over an unlicensed PRS band supported by each device. Each UE may use the information included in the received post-PRS message to calculate a range and position of the other UE.

Figure 9B:
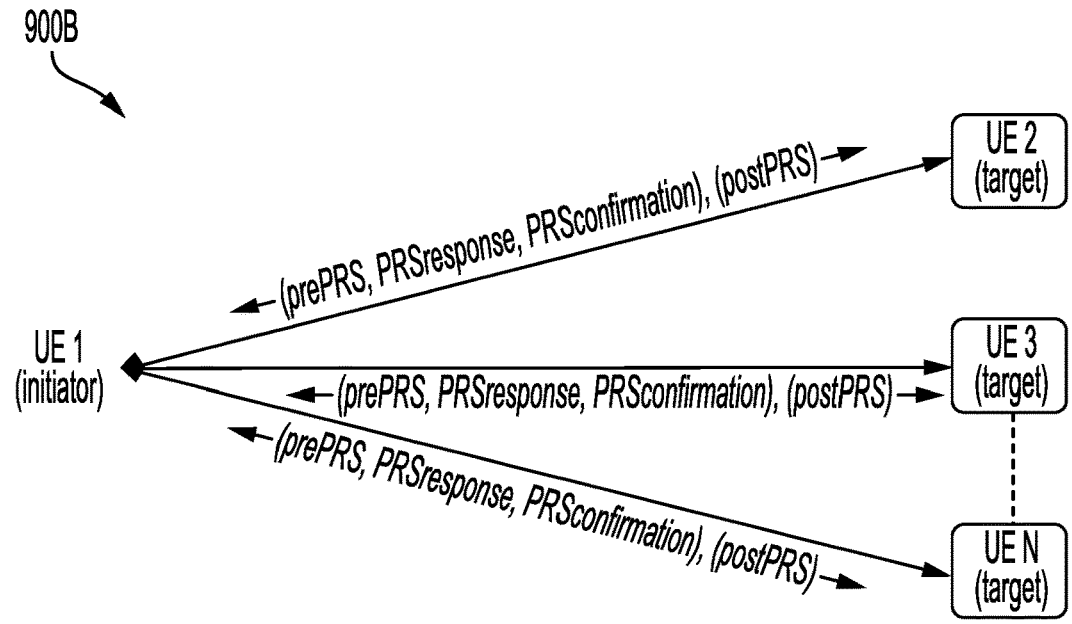
FIG. 9B is another flow diagram of an example process for configuring a NR-SL positioning session based on PRS messages exchanged between an initiator UE and multiple target UEs according to some embodiments of this disclosure.

The process 900A may be extended to include multiple target UEs, as shown in FIG. 9B. FIG. 9B is another flow diagram of an example process 900B in which PRS measurements included in post-PRS messages exchanged between an initiator UE and multiple target UEs during a NR-SL ranging session are used by each UE for positioning calculations.

Figure 10:
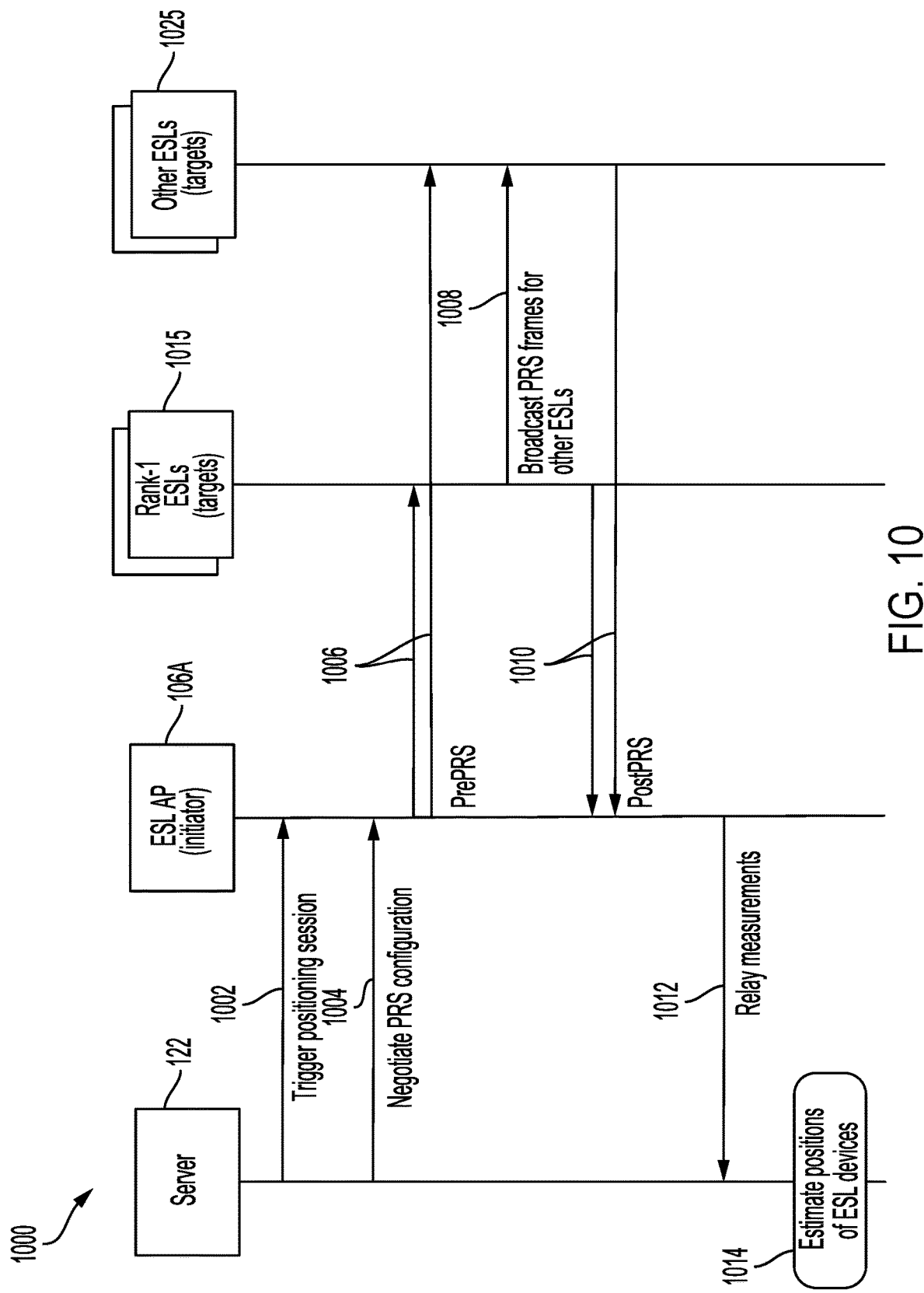
FIG. 10 is a signaling diagram illustrating an example communication flow between different devices of an ESL system for iterative positioning of ESL devices during a SL positioning session according to some embodiments of this disclosure.

FIG. 10 is a signaling diagram illustrating an example communication flow 1000 between different devices of an ESL system for iterative positioning of ESL devices based on PRS measurements during a SL ranging or positioning session according to some embodiments of this disclosure. The initiator of the SL ranging/positioning session in this example may be ESL AP 106A and the targets may include a combined set of rank-1 (or anchor) ESLs 1015 and other ESLs 1025 within the environment.

At 1002, the server 122 (e.g., via gateway node 120 of FIG. 1B) may trigger a positioning session, for example, by sending an initial command to the AP 106A.

At 1004, the server 122 and the AP 106A may negotiate PRS configuration parameters, as described above. At 1006, the AP 106A may send a pre-PRS message with various session parameters to the rank-1 ESLs 1015 and the other ESLs 1025.

At 1008, the rank-1 ESLs 1015 begin broadcasting PRS frames for reception by the ESLs 1025, e.g., in accordance with the parameters received at 1006 from the AP 106A.

At 1010, post-PRS messages including PRS measurements of the PRS frames received by the ESLs 1025 are transmitted to the AP 106A. The post-PRS messages may also include PRS measurements of PRS frames received by the ESLs 1015 from the AP 106A. At 1012, the AP 106A relays the PRS measurements to the server 122. At 1014, the server 122 may use the PRS measurements to estimate positions of the ESLs 1015 and 1025.

The server 122 at 1014 may also determine a positioning error representing a level of uncertainty associated with the estimated position for each ESL. As described above, the server 122 may also assign a rank to each ESL according to the positioning error or uncertainty. If the positioning error is greater than a maximum positioning error tolerance, the communication flow 1000 may be repeated for one or more additional positioning sessions triggered by the server 122 for one or more subsequent iterations of the positioning process until the positioning error associated with the estimated position of each ESL is less than the positioning error tolerance, as described above.

Figure 11:
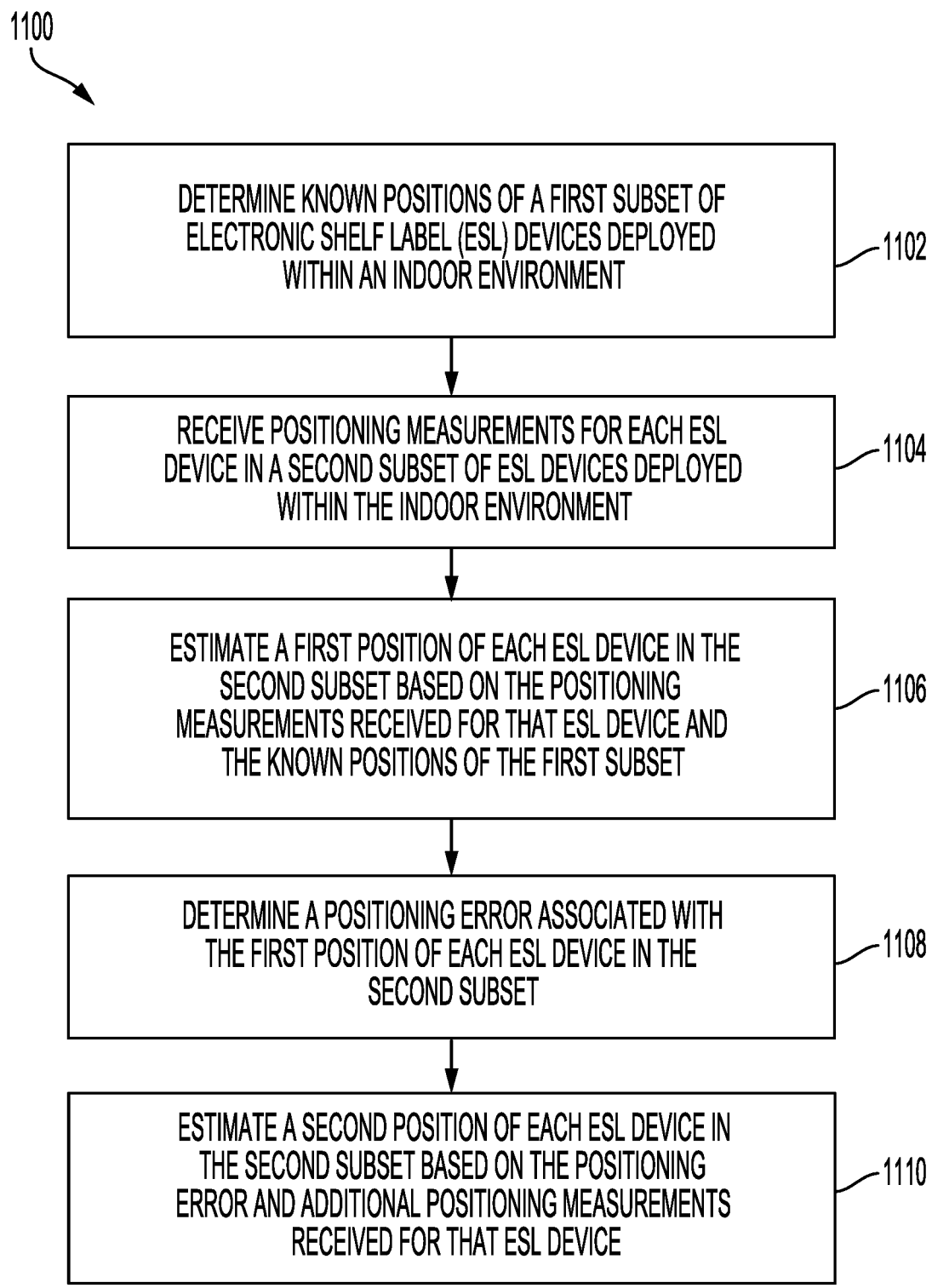
FIG. 11 is a flow chart of an example method for iteratively positioning ESL devices within an indoor environment according to some embodiments of this disclosure.

FIG. 11 is a flow chart of an example method 1100 for iteratively positioning ESL devices of an ESL system deployed within an indoor environment according to some embodiments of this disclosure. For discussion purposes, method 1100 will be described using the ESL system 100 of FIG. 1B, as described above. For example, the method 1100 including the operations described below may be performed by the management server 122 of the ESL system 100, as described above.

Method 1100 begins at block 1102, which includes determining known positions of a first subset of Electronic Shelf Label (ESL) devices deployed within an indoor environment. The ESL devices in the first subset may be anchor nodes of the ESL system whose positions within the indoor environment are known, as described above.

At block 1104, positioning measurements may be received for each ESL device in a second subset of ESL devices deployed within the indoor environment. The ESL devices in the second subset may be target devices whose positions are unknown or uncertain.

At block 1106, a first position of each ESL device in the second subset is estimated based on the positioning measurements received for that ESL device and the known positions of the first subset of ESL devices.

At block 1108, a positioning error associated with the first position of each ESL device in the second subset is determined.

At block 1110, a second position of each ESL device in the second subset is estimated based on the positioning error associated with the first position and additional positioning measurements received for that ESL device. For example, the first position of each (target) ESL device in the second subset may serve as a coarse location of the device that is estimated during a first iteration of the method 1100. Therefore, the first position may be further refined based on additional positioning measurements obtained for each target device over one or more subsequent iterations, e.g., until the position estimated for each target ESL device is less than a maximum positioning error tolerance.

It is noted that one or more blocks (or operations) described with reference to FIGS. 1-4 may be combined with one or more blocks (or operations) described with reference to another of the figures. For example, one or more blocks (or operations) of FIG. 11 may be combined with one or more blocks (or operations) of FIGS. 1-4.

In one or more aspects, techniques for supporting ESL systems may include additional aspects, such as any single aspect or any combination of aspects described below or in connection with one or more other processes or devices described elsewhere herein. In a first aspect, a method comprises: determining known positions of a first subset of Electronic Shelf Label (ESL) devices; receiving positioning measurements for each ESL device in a second subset of ESL devices; estimating a first position of each ESL device in the second subset based on the positioning measurements received for that ESL device and the known positions of the first subset; determining a positioning error associated with the first position of each ESL device in the second subset; and estimating a second position of each ESL device in the second subset based on the positioning error and additional positioning measurements received for that ESL device.

In a second aspect, in combination with the first aspect, the positioning measurements include radio frequency (RF) measurements collected by each ESL device in the second subset based on radio signals broadcasted by the first subset of ESL devices.

In a third aspect, in combination with one or more of the first aspect or the second aspect, the radio signals are broadcasted by the first subset of ESL devices according to at least one of a Time Division Multiple Access (TDMA) scheme or a Frequency Division Multiple Access (FDMA) scheme.

In a fourth aspect, in combination with one or more of the first aspect through the third aspect, the positioning error associated with the first position of each ESL device in the second subset is based on one or more measurement errors associated with the RF measurements collected by that ESL device.

In a fifth aspect, in combination with one or more of the first aspect through the fourth aspect, the one or more measurement errors are based on at least one of a signal-to-noise ratio of the corresponding the RF measurements or a geometric dilution of precision of each ESL device in the second subset relative to a known position of each ESL device in the first subset.

In a sixth aspect, in combination with one or more of the first aspect through the fifth aspect, the method further comprises: determining that the positioning error associated with the first position of each ESL device in the second subset is greater than a maximum positioning error tolerance; identifying at least one ESL device in the first subset for which a known location is within a vicinity of the first position of each ESL device in the second subset; and transmitting, to the at least one ESL device in the first subset identified for each ESL device in the second subset, a command to broadcast the radio signals for measurement by the corresponding ESL device in the second subset.

In a seventh aspect, in combination with one or more of the first aspect through the sixth aspect, the first and second subsets of ESL devices are deployed within a retail environment including a plurality of gondolas, each ESL device in the first and second subsets is attached to a shelf of at least one gondola of the plurality of gondolas within the retail environment, and the method further comprises transmitting, to a user device associated with the retail environment, a notification identifying at least one ESL device in the second subset for which the positioning error associated with the second position is greater than the maximum positioning error tolerance.

In an eighth aspect, in combination with one or more of the first aspect through the seventh aspect, the method further comprises: receiving an indication of a change in the known positions of one or more ESL devices in the first subset; responsive to receiving the indication, transmitting, to each ESL device in a combined set of ESL devices including the one or more ESL devices in the first subset and each ESL device in the second subset, a command to initiate a positioning session; estimating a position of each ESL device in the combined set based on further positioning measurements received for that ESL device during the positioning session; determining the positioning error associated with the estimated position of each ESL device in the combined set; and transmitting, to a user device, a notification identifying at least one ESL device in the combined set for which the positioning error is greater than a maximum positioning error tolerance.

In a ninth aspect, in combination with one or more of the first aspect through the eighth aspect, the command transmitted to each ESL device in the combined set includes scheduling information for different groups of ESL devices in the combined set, and wherein the scheduling information includes a group identifier, a communication channel, and a time slot for communications over the communication channel.

In a tenth aspect, in combination with one or more of the first aspect through the ninth aspect, the command includes a sidelink (SL) positioning reference signal (PRS) configuration, and wherein the positioning session is a SL PRS ranging session initiated based on the SL PRS configuration transmitted to each ESL device in the combined set.

In an eleventh aspect, an apparatus comprises a memory storing processor-readable code; and at least one processor coupled to the memory, the at least one processor configured to execute the processor-readable code to cause the at least one processor to perform operations including: determining known positions of a first subset of Electronic Shelf Label (ESL) devices; receiving positioning measurements for each ESL device in a second subset of ESL devices; estimating a first position of each ESL device in the second subset based on the positioning measurements received for that ESL device and the known positions of the first subset; determining a positioning error associated with the first position of each ESL device in the second subset; and estimating a second position of each ESL device in the second subset based on the positioning error and additional positioning measurements received for that ESL device.

In a twelfth aspect, in combination with the eleventh aspect, the positioning measurements include radio frequency (RF) measurements collected by each ESL device in the second subset based on radio signals broadcasted by the first subset of ESL devices.

In a thirteenth aspect, in combination with one or more of the eleventh aspect or the twelfth aspect, the radio signals are broadcasted by the first subset of ESL devices according to at least one of a Time Division Multiple Access (TDMA) scheme or a Frequency Division Multiple Access (FDMA) scheme.

In a fourteenth aspect, in combination with one or more of the eleventh aspect through the thirteenth aspect, the positioning error associated with the first position of each ESL device in the second subset is based on one or more measurement errors associated with the RF measurements collected by that ESL device.

In a fifteenth aspect, in combination with one or more of the eleventh aspect through the fourteenth aspect, the one or more measurement errors are based on at least one of a signal-to-noise ratio of the corresponding the RF measurements or a geometric dilution of precision of each ESL device in the second subset relative to a known position of each ESL device in the first subset.

In a sixteenth aspect, in combination with one or more of the eleventh aspect through the fifteenth aspect, the operations further include: determining that the positioning error associated with the first position of each ESL device in the second subset is greater than a maximum positioning error tolerance; identifying at least one ESL device in the first subset for which a known location is within a vicinity of the first position of each ESL device in the second subset; and transmitting, to the at least one ESL device in the first subset identified for each ESL device in the second subset, a command to broadcast the radio signals for measurement by the corresponding ESL device in the second subset.

In a seventeenth aspect, in combination with one or more of the eleventh aspect through the sixteenth aspect, the first and second subsets of ESL devices are deployed within a retail environment including a plurality of gondolas, each ESL device in the first and second subsets is attached to a shelf of at least one gondola of the plurality of gondolas within the retail environment, and the operations further include: transmitting, to a user device associated with the retail environment, a notification identifying at least one ESL device in the second subset for which the positioning error associated with the second position is greater than the maximum positioning error tolerance.

In an eighteenth aspect, in combination with one or more of the eleventh aspect through the seventeenth aspect, the operations further include: receiving an indication of a change in the known positions of one or more ESL devices in the first subset; responsive to receiving the indication, transmitting, to each ESL device in a combined set of ESL devices including the one or more ESL devices in the first subset and each ESL device in the second subset, a command to initiate a positioning session; estimating a position of each ESL device in the combined set based on further positioning measurements received for that ESL device during the positioning session; determining the positioning error associated with the estimated position of each ESL device in the combined set; and transmitting, to a user device, a notification identifying at least one ESL device in the combined set for which the positioning error is greater than a maximum positioning error tolerance.

In a nineteenth aspect, in combination with one or more of the eleventh aspect through the eighteenth aspect, the command transmitted to each ESL device in the combined set includes scheduling information for different groups of ESL devices in the combined set, and the scheduling information includes a group identifier, a communication channel, and a time slot for communications over the communication channel.

In a twentieth aspect, in combination with one or more of the eleventh aspect through the nineteenth aspect, the command includes a sidelink (SL) positioning reference signal (PRS) configuration, and wherein the positioning session is a SL PRS ranging session initiated based on the SL PRS configuration transmitted to each ESL device in the combined set.

In a twenty-first aspect, in combination with one or more of the eleventh aspect through the twentieth aspect, a non-transitory computer-readable medium storing instructions that, when executed by a processor, cause the processor to perform operations comprising: determining known positions of a first subset of Electronic Shelf Label (ESL) devices; receiving positioning measurements for each ESL device in a second subset of ESL devices; estimating a first position of each ESL device in the second subset based on the positioning measurements received for that ESL device and the known positions of the first subset; determining a positioning error associated with the first position of each ESL device in the second subset; and estimating a second position of each ESL device in the second subset based on the positioning error and additional positioning measurements received for that ESL device.

In a twenty-second aspect, in combination with one or more of the eleventh aspect through the twenty-first aspect, the positioning measurements include radio frequency (RF) measurements collected by each ESL device in the second subset based on radio signals broadcasted by the first subset of ESL devices.

In a twenty-third aspect, in combination with one or more of the eleventh aspect through the twenty-second aspect, the positioning error associated with the first position of each ESL device in the second subset is based on one or more measurement errors associated with the RF measurements collected by that ESL device.

In a twenty-fourth aspect, in combination with one or more of the eleventh aspect through the twenty-third aspect, the one or more measurement errors are based on at least one of a signal-to-noise ratio of the corresponding the RF measurements or a geometric dilution of precision of each ESL device in the second subset relative to a known position of each ESL device in the first subset.

In a twenty-fifth aspect, in combination with one or more of the eleventh aspect through the twenty-fourth aspect, the operations further comprise: determining that the positioning error associated with the first position of each ESL device in the second subset is greater than a maximum positioning error tolerance; identifying at least one ESL device in the first subset for which a known location is within a vicinity of the first position of each ESL device in the second subset; and transmitting, to the at least one ESL device in the first subset identified for each ESL device in the second subset, a command to broadcast the radio signals for measurement by the corresponding ESL device in the second subset.

In a twenty-sixth aspect, in combination with one or more of the eleventh aspect through the twenty-fifth aspect, the first and second subsets of ESL devices are deployed within a retail environment including a plurality of gondolas, wherein each ESL device in the first and second subsets is attached to a shelf of at least one gondola of the plurality of gondolas within the retail environment, and wherein the operations further comprise transmitting, to a user device associated with the retail environment, a notification identifying at least one ESL device in the second subset for which the positioning error associated with the second position is greater than the maximum positioning error tolerance.

In a twenty-seventh aspect, an electronic shelf label (ESL) system comprises: a first subset of electronic shelf label (ESL) devices; a second subset of ESL devices; and a server comprising a first memory; and a first at least one processor coupled to the first memory and configured to perform operations comprising: determining known positions of the first subset of ESL devices; receiving positioning measurements for each ESL device in the second subset of ESL devices; estimating a first position of each ESL device in the second subset based on the positioning measurements received for that ESL device and the known positions of the first subset; determining a positioning error associated with the first position of each ESL device in the second subset; and estimating a second position of each ESL device in the second subset based on the positioning error and additional positioning measurements received for that ESL device.

In a twenty-eighth aspect, in combination with the twenty-seventh aspect, the positioning measurements include radio frequency (RF) measurements collected by each ESL device in the second subset based on radio signals broadcasted by the first subset of ESL devices.

In a twenty-ninth aspect, in combination with one or more of the twenty-seventh aspect or the twenty-eighth aspect, the operations further comprise: determining that the positioning error associated with the first position of each ESL device in the second subset is greater than a maximum positioning error tolerance; identifying at least one ESL device in the first subset for which a known location is within a vicinity of the first position of each ESL device in the second subset; and transmitting, to the at least one ESL device in the first subset identified for each ESL device in the second subset, a command to broadcast the radio signals for measurement by the corresponding ESL device in the second subset.

In a thirtieth aspect, in combination with one or more of the twenty-seventh aspect through the twenty-ninth aspect, the first and second subsets of ESL devices are deployed within a retail environment including a plurality of gondolas, wherein each ESL device in the first and second subsets is attached to a shelf of at least one gondola of the plurality of gondolas within the retail environment, and wherein the operations further comprise: transmitting, to a user device associated with the retail environment, a notification identifying at least one ESL device in the second subset for which the positioning error associated with the second position is greater than the maximum positioning error tolerance.

Components, the functional blocks, and the modules described herein with respect to the figures described above include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein but are to be accorded the widest scope consistent with this disclosure, the principles and the novel features disclosed herein.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method comprising:
   determining known positions of a first subset of Electronic Shelf Label (ESL) devices;
   receiving positioning measurements for each ESL device in a second subset of ESL devices;
   estimating a first position of each ESL device in the second subset based on the positioning measurements received for that ESL device and the known positions of the first subset;
   determining a positioning error associated with the first position of each ESL device in the second subset;
   identifying at least one ESL device in the first subset for which a known location is within a vicinity of the first position of each ESL device in the second subset; and
   estimating a second position of each ESL device in the second subset based on the positioning error and additional positioning measurements received for that ESL device from the at least one ESL device in the first subset identified for that ESL device in the second subset.

2. The method of claim 1, wherein the positioning measurements include radio frequency (RF) measurements collected by each ESL device in the second subset based on radio signals broadcasted by the first subset of ESL devices.

3. The method of claim 2, wherein the radio signals are broadcasted by the first subset of ESL devices according to at least one of a Time Division Multiple Access (TDMA) scheme or a Frequency Division Multiple Access (FDMA) scheme.

4. The method of claim 2, wherein the positioning error associated with the first position of each ESL device in the second subset is based on one or more measurement errors associated with the RF measurements collected by that ESL device.

5. The method of claim 4, wherein the one or more measurement errors are based on at least one of a signal-to-noise ratio of the corresponding the RF measurements or a geometric dilution of precision of each ESL device in the second subset relative to a known position of each ESL device in the first subset.

6. The method of claim 2, further comprising:
determining that the positioning error associated with the first position of each ESL device in the second subset is greater than a maximum positioning error tolerance; and
transmitting, to the at least one ESL device in the first subset identified for each ESL device in the second subset, a command to broadcast the radio signals for measurement by the corresponding ESL device in the second subset.

7. The method of claim 6, wherein the first and second subsets of ESL devices are deployed within a retail environment including a plurality of gondolas, wherein each ESL device in the first and second subsets is attached to a shelf of at least one gondola of the plurality of gondolas within the retail environment, and wherein the method further comprises:
transmitting, to a user device associated with the retail environment, a notification identifying at least one ESL device in the second subset for which the positioning error associated with the second position is greater than the maximum positioning error tolerance.

8. The method of claim 1, further comprising:
receiving an indication of a change in the known positions of one or more ESL devices in the first subset;
responsive to receiving the indication, transmitting, to each ESL device in a combined set of ESL devices including the one or more ESL devices in the first subset and each ESL device in the second subset, a command to initiate a positioning session;
estimating a position of each ESL device in the combined set based on further positioning measurements received for that ESL device during the positioning session;
determining the positioning error associated with the estimated position of each ESL device in the combined set; and
transmitting, to a user device, a notification identifying at least one ESL device in the combined set for which the positioning error is greater than a maximum positioning error tolerance.

9. The method of claim 8, wherein the command transmitted to each ESL device in the combined set includes scheduling information for different groups of ESL devices in the combined set, and wherein the scheduling information includes a group identifier, a communication channel, and a time slot for communications over the communication channel.

10. The method of claim 8, wherein the command includes a sidelink (SL) positioning reference signal (PRS) configuration, and wherein the positioning session is a SL PRS ranging session initiated based on the SL PRS configuration transmitted to each ESL device in the combined set.

11. An apparatus, comprising:
a memory storing processor-readable code; and
at least one processor coupled to the memory, the at least one processor configured to execute the processor-readable code to cause the at least one processor to perform operations including:
determining known positions of a first subset of Electronic Shelf Label (ESL) devices;
receiving positioning measurements for each ESL device in a second subset of ESL devices;
estimating a first position of each ESL device in the second subset based on the positioning measurements received for that ESL device and the known positions of the first subset;
determining a positioning error associated with the first position of each ESL device in the second subset;
identifying at least one ESL device in the first subset for which a known location is within a vicinity of the first position of each ESL device in the second subset; and
estimating a second position of each ESL device in the second subset based on the positioning error and additional positioning measurements received for that ESL device from the at least one ESL device in the first subset identified for that ESL device in the second subset.

12. The apparatus of claim 11, wherein the positioning measurements include radio frequency (RF) measurements collected by each ESL device in the second subset based on radio signals broadcasted by the first subset of ESL devices.

13. The apparatus of claim 12, wherein the radio signals are broadcasted by the first subset of ESL devices according to at least one of a Time Division Multiple Access (TDMA) scheme or a Frequency Division Multiple Access (FDMA) scheme.

14. The apparatus of claim 12, wherein the positioning error associated with the first position of each ESL device in the second subset is based on one or more measurement errors associated with the RF measurements collected by that ESL device.

15. The apparatus of claim 14, wherein the one or more measurement errors are based on at least one of a signal-to-noise ratio of the corresponding the RF measurements or a geometric dilution of precision of each ESL device in the second subset relative to a known position of each ESL device in the first subset.

16. The apparatus of claim 12, wherein the operations further include:
determining that the positioning error associated with the first position of each ESL device in the second subset is greater than a maximum positioning error tolerance; and
transmitting, to the at least one ESL device in the first subset identified for each ESL device in the second subset, a command to broadcast the radio signals for measurement by the corresponding ESL device in the second subset.

17. The apparatus of claim 16, wherein the first and second subsets of ESL devices are deployed within a retail environment including a plurality of gondolas, wherein each ESL device in the first and second subsets is attached to a shelf of at least one gondola of the plurality of gondolas within the retail environment, and wherein the operations further include:
transmitting, to a user device associated with the retail environment, a notification identifying at least one ESL device in the second subset for which the positioning error associated with the second position is greater than the maximum positioning error tolerance.

18. The apparatus of claim 11, wherein the operations further include:
   receiving an indication of a change in the known positions of one or more ESL devices in the first subset;
   responsive to receiving the indication, transmitting, to each ESL device in a combined set of ESL devices including the one or more ESL devices in the first subset and each ESL device in the second subset, a command to initiate a positioning session;
   estimating a position of each ESL device in the combined set based on further positioning measurements received for that ESL device during the positioning session;
   determining the positioning error associated with the estimated position of each ESL device in the combined set; and
   transmitting, to a user device, a notification identifying at least one ESL device in the combined set for which the positioning error is greater than a maximum positioning error tolerance.

19. The apparatus of claim 18, wherein the command transmitted to each ESL device in the combined set includes scheduling information for different groups of ESL devices in the combined set, and wherein the scheduling information includes a group identifier, a communication channel, and a time slot for communications over the communication channel.

20. The apparatus of claim 18, wherein the command includes a sidelink (SL) positioning reference signal (PRS) configuration, and wherein the positioning session is a SL PRS ranging session initiated based on the SL PRS configuration transmitted to each ESL device in the combined set.

21. A non-transitory computer-readable medium storing instructions that, when executed by a processor, cause the processor to perform operations comprising:
   determining known positions of a first subset of Electronic Shelf Label (ESL) devices;
   receiving positioning measurements for each ESL device in a second subset of ESL devices;
   estimating a first position of each ESL device in the second subset based on the positioning measurements received for that ESL device and the known positions of the first subset;
   determining a positioning error associated with the first position of each ESL device in the second subset;
   identifying at least one ESL device in the first subset for which a known location is within a vicinity of the first position of each ESL device in the second subset; and
   estimating a second position of each ESL device in the second subset based on the positioning error and additional positioning measurements received for that ESL device from the at least one ESL device in the first subset identified for that ESL device in the second subset.

22. The non-transitory computer-readable medium of claim 21, wherein the positioning measurements include radio frequency (RF) measurements collected by each ESL device in the second subset based on radio signals broadcasted by the first subset of ESL devices.

23. The non-transitory computer-readable medium of claim 22, wherein the positioning error associated with the first position of each ESL device in the second subset is based on one or more measurement errors associated with the RF measurements collected by that ESL device.

24. The non-transitory computer-readable medium of claim 23, wherein the one or more measurement errors are based on at least one of a signal-to-noise ratio of the corresponding the RF measurements or a geometric dilution of precision of each ESL device in the second subset relative to a known position of each ESL device in the first subset.

25. The non-transitory computer-readable medium of claim 22, wherein the operations further comprise:
   determining that the positioning error associated with the first position of each ESL device in the second subset is greater than a maximum positioning error tolerance; and
   transmitting, to the at least one ESL device in the first subset identified for each ESL device in the second subset, a command to broadcast the radio signals for measurement by the corresponding ESL device in the second subset.

26. The non-transitory computer-readable medium of claim 25, wherein the first and second subsets of ESL devices are deployed within a retail environment including a plurality of gondolas, wherein each ESL device in the first and second subsets is attached to a shelf of at least one gondola of the plurality of gondolas within the retail environment, and wherein the operations further comprise:
   transmitting, to a user device associated with the retail environment, a notification identifying at least one ESL device in the second subset for which the positioning error associated with the second position is greater than the maximum positioning error tolerance.

27. An electronic shelf label (ESL) system comprising:
   a first subset of electronic shelf label (ESL) devices;
   a second subset of ESL devices; and
   a server comprising a memory; and at least one processor coupled to the memory and configured to perform operations comprising:
   determining known positions of the first subset of ESL devices;
   receiving positioning measurements for each ESL device in the second subset of ESL devices;
   estimating a first position of each ESL device in the second subset based on the positioning measurements received for that ESL device and the known positions of the first subset;
   determining a positioning error associated with the first position of each ESL device in the second subset;
   identifying at least one ESL device in the first subset for which a known location is within a vicinity of the first position of each ESL device in the second subset; and
   estimating a second position of each ESL device in the second subset based on the positioning error and additional positioning measurements received for that ESL device from the at least one ESL device in the first subset identified for that ESL device in the second subset.

28. The ESL system of claim 27, wherein the positioning measurements include radio frequency (RF) measurements collected by each ESL device in the second subset based on radio signals broadcasted by the first subset of ESL devices.

29. The ESL system of claim 28, wherein the operations further comprise:
   determining that the positioning error associated with the first position of each ESL device in the second subset is greater than a maximum positioning error tolerance; and
   transmitting, to the at least one ESL device in the first subset identified for each ESL device in the second subset, a command to broadcast the radio signals for measurement by the corresponding ESL device in the second subset.

30. The ESL system of claim 29, wherein the first and second subsets of ESL devices are deployed within a retail environment including a plurality of gondolas, wherein each ESL device in the first and second subsets is attached to a shelf of at least one gondola of the plurality of gondolas within the retail environment, and wherein the operations further comprise:
   transmitting, to a user device associated with the retail environment, a notification identifying at least one ESL device in the second subset for which the positioning error associated with the second position is greater than the maximum positioning error tolerance.

* * * * *